United States Patent [19]
Takamine et al.

[11] Patent Number: 5,566,152
[45] Date of Patent: Oct. 15, 1996

[54] TRACKING CONTROL SYSTEM WITH CORRECTION CAPABILITIES FOR CORRECTING DISAGREEMENT BETWEEN OPTICAL AXES

[75] Inventors: Kouichi Takamine, Hirakata; Katsuya Watanabe, Suita, both of Japan

[73] Assignee: Matsushita Electric Industrial Co., Ltd., Kadoma, Japan

[21] Appl. No.: 534,731

[22] Filed: Sep. 27, 1995

Related U.S. Application Data

[63] Continuation of Ser. No. 139,315, Oct. 19, 1993, abandoned.

[30] Foreign Application Priority Data

Oct. 21, 1992 [JP] Japan .................................. 4-282665
Mar. 10, 1993 [JP] Japan .................................. 5-048835

[51] Int. Cl.$^6$ .................................................. G11B 7/085
[52] U.S. Cl. ........................... 369/44.28; 369/44.32; 369/44.34; 369/44.35
[58] Field of Search .................................. 369/32, 44.28, 369/44.29, 44.32, 44.34, 44.35

[56] References Cited

U.S. PATENT DOCUMENTS

| | | | |
|---|---|---|---|
| 4,768,180 | 8/1988 | Janssen et al. | 369/44.32 |
| 4,773,055 | 9/1988 | Gijzen et al. | 369/44.32 X |
| 4,849,953 | 7/1989 | Nomura et al. | 369/44.28 |
| 5,090,001 | 2/1992 | Ito et al. | 369/44.28 |
| 5,117,410 | 5/1992 | Akiyama | 369/44.28 X |
| 5,199,012 | 3/1993 | Imai | 369/44.28 X |
| 5,241,522 | 8/1993 | Yanagi | 369/44.28 X |
| 5,285,435 | 2/1994 | Takasago | 369/44.28 |
| 5,293,364 | 3/1994 | Shimonou | 369/44.28 X |

FOREIGN PATENT DOCUMENTS

| | | |
|---|---|---|
| 63-263637 | 10/1988 | Japan . |
| 1263946 | 10/1989 | Japan . |
| 2192029 | 7/1990 | Japan . |
| 378120 | 4/1991 | Japan . |
| 4228121 | 8/1992 | Japan . |
| 1451799 | 10/1976 | United Kingdom . |

Primary Examiner—W. R. Young
Attorney, Agent, or Firm—Renner, Otto, Boisselle & Sklar P.L.L.

[57] ABSTRACT

A tracking control system according to the present invention includes an objective lens for converging a light beam at a point on a recording medium to form a converging spot; a galvano-mirror for receiving a driving signal and for moving the converging spot across tracks provided on the recording medium in response to the driving signal; a tracking error detecting section for generating a tracking error signal according to a position of the converging spot with respect to one of the tracks; a tracking servo control section for generating a first driving signal according to the tracking error signal end for feeding the first driving signal to the galvano-mirror as the driving signal, by which the galvano-mirror is driven so that the converging spot is located on the one track; a signal selection circuit for turning on and off the tracking servo control section; a driving section for, when tracking servo control is turned off, generating a second driving signal by which the galvano-mirror is driven so that the converging spot crosses predetermined number of tracks among the tracks; a measuring section for, when the tracking servo control is turned off, measuring a degree of disagreement of optical axes based on the tracking error signal obtained by driving the galvano-mirror with the second driving signal; and a correcting section for correcting the disagreement of optical axes by constantly supplying the galvano-mirror with a current for making the degree of disagreement of optical axes substantially zero based on the measured degree of disagreement of optical axes.

6 Claims, 13 Drawing Sheets

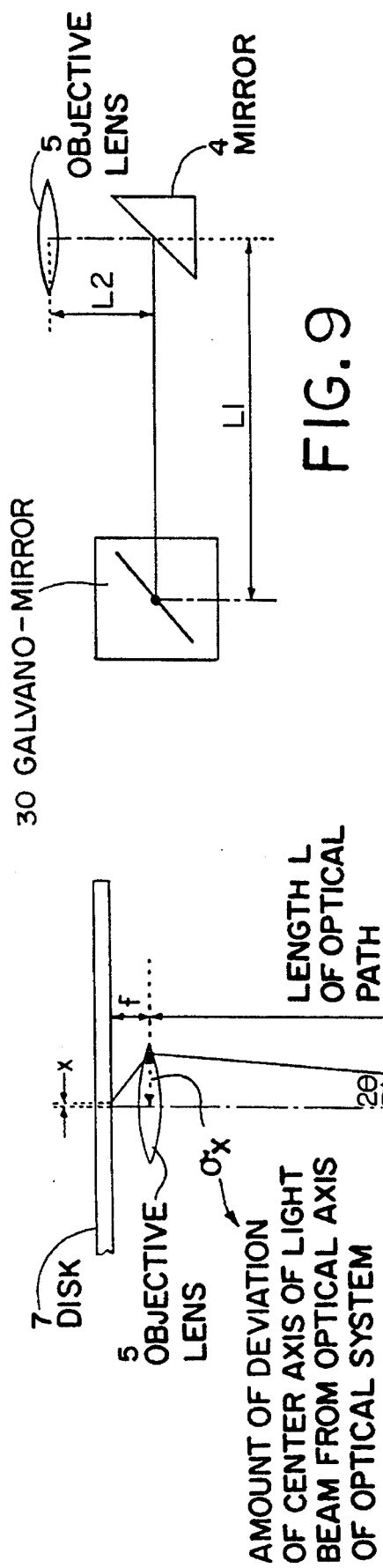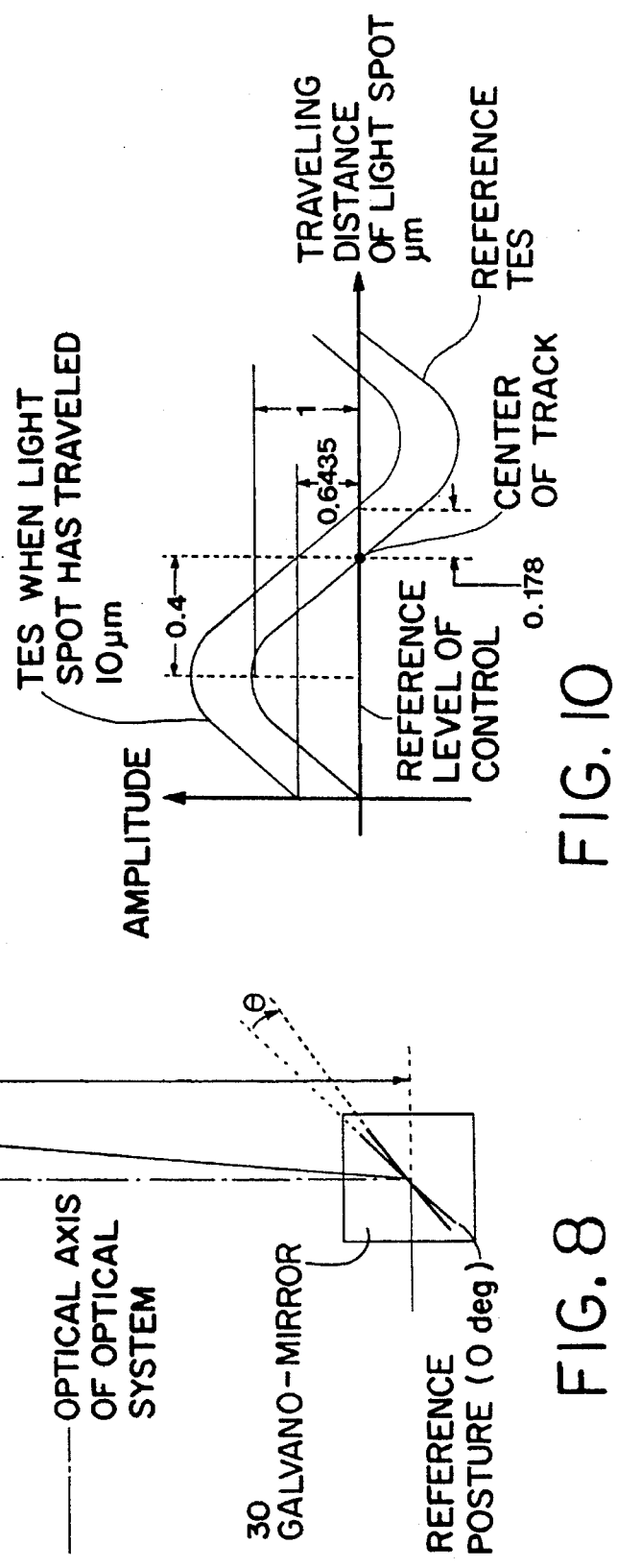

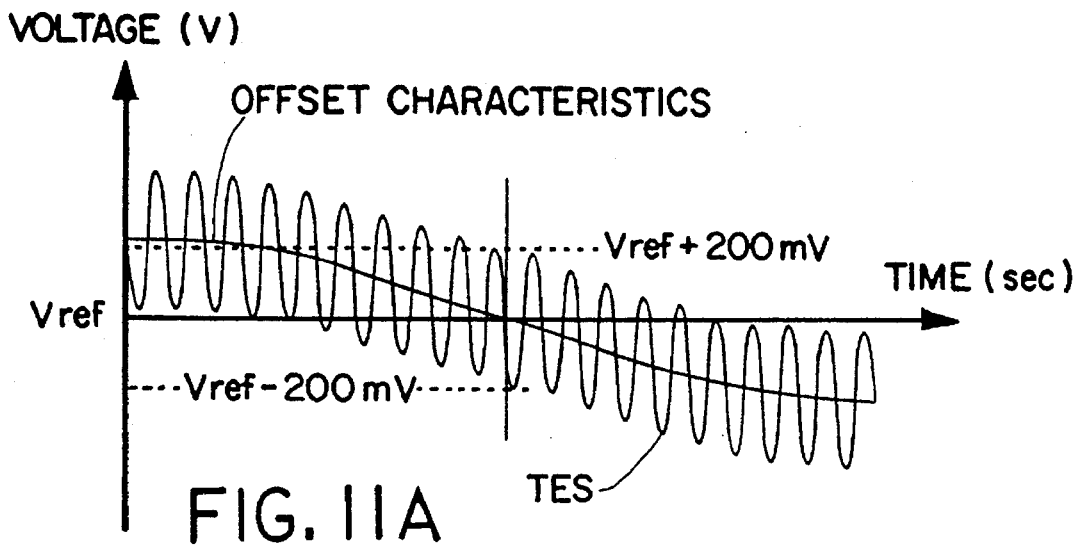
FIG. 11A
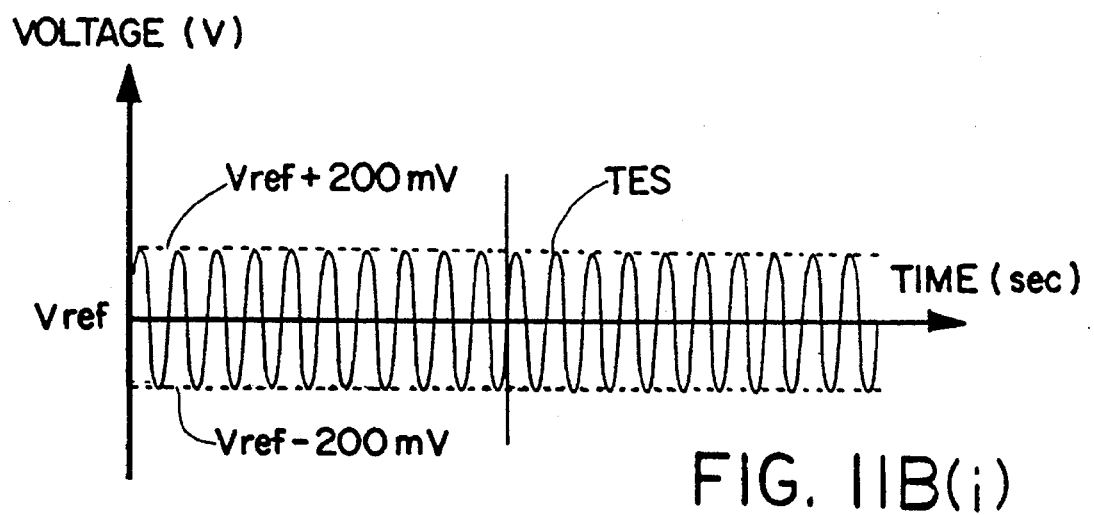
FIG. 11B(i)
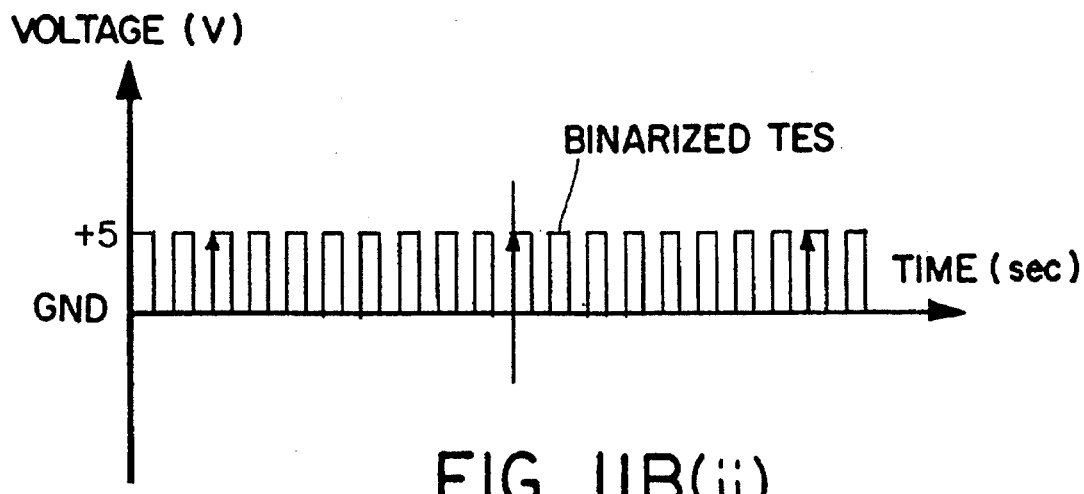
FIG. 11B(ii)

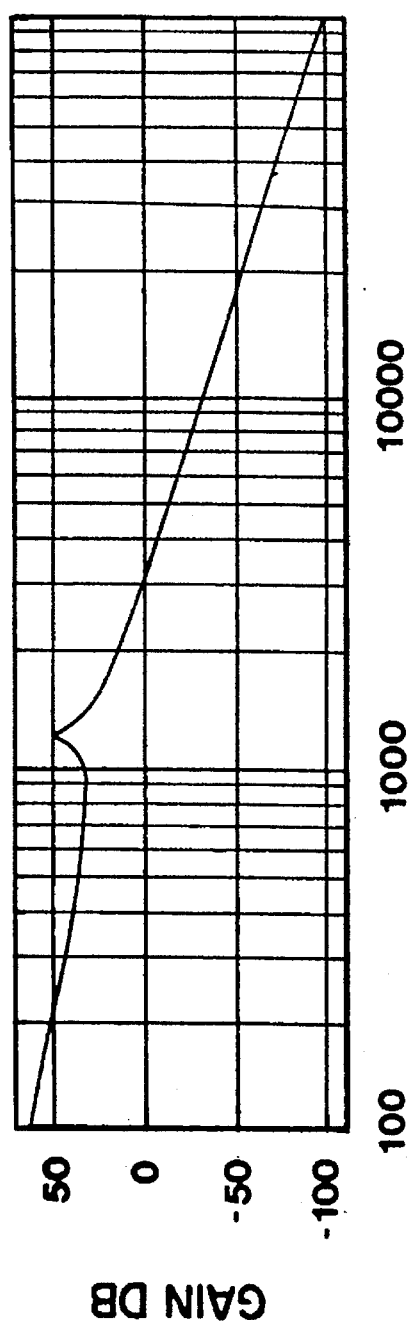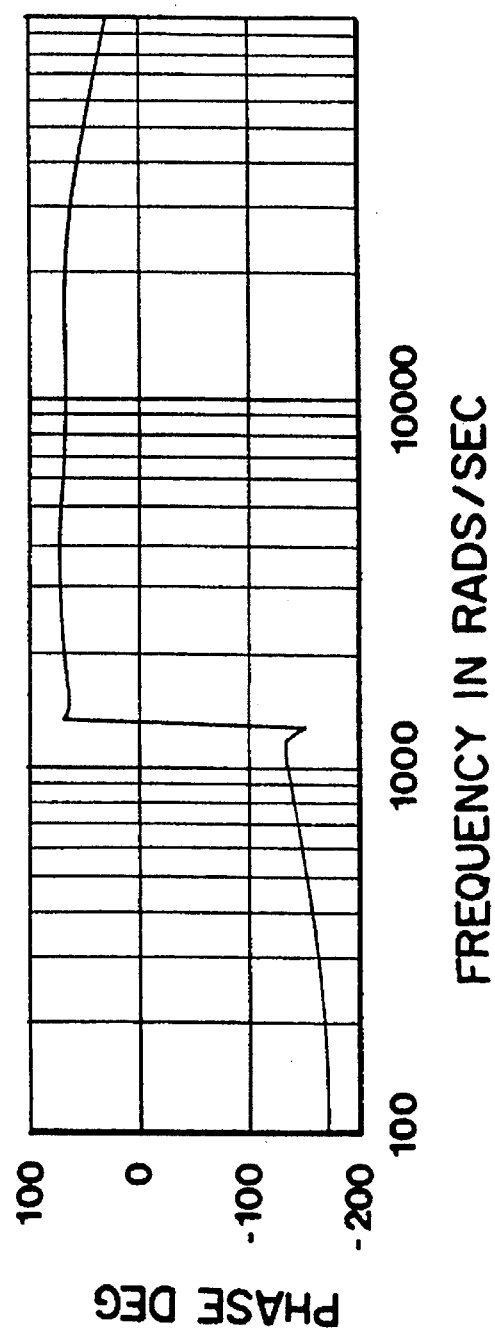
FIG. 20A
FIG. 20B

TRACKING CONTROL SYSTEM WITH CORRECTION CAPABILITIES FOR CORRECTING DISAGREEMENT BETWEEN OPTICAL AXES

This application is a continuation of application(s) Ser. No. 08/139,315 filed on Oct. 19, 1993, now abandoned.

BACKGROUND OF THE INVENTION

1. Field of the Invention

The present invention relates to an optical recording and reproducing apparatus for optically recording signals on a recording medium and reproducing signals carried on a recording medium, in which a light source such as a laser is used. More specifically, the present invention relates to a tracking control system for controlling a light beam to accurately scan on the tracks of a recording medium.

2. Description of the Related Art

In recent years, as one way to realize a thin optical recording and reproducing apparatus or to facilitate rapid scanning by the apparatus, it has become known to conduct tracking by moving a movable portion (i.e. optical head) composed of optical elements that have been separated from the optical system of the apparatus instead of moving the whole optical system. Furthermore, there has been devised a construction in which a galvano-mirror is used as the tracking actuator disposed in a stationary portion so as to reduce the weight of the movable portion.

Hereinafter, a conventional tracking control system will be described with reference to FIG. 21, which is a block diagram showing a construction for a conventional tracking control system.

As is shown in FIG. 21, a light beam 108 emitted from a light source 101 such as a laser diode is collimated by a collimating lens 102, and thereafter goes through a beam splitter 103 so as to be reflected by a galvano-mirror 130 serving as a fine tracking actuator. The light beam reflected by the galvano-mirror 130 is further reflected by a mirror 104 disposed in a movable portion, and is thereafter converged on a rotating disk 107 by means of an objective lens 105. The disk 107 is connected to a spindle motor 106, which rotates the disk 107.

The light beam is reflected by the disk 107, led through the objective lens 105, and thereafter is reflected by the mirror 104 and the galvano-mirror 130 in the respective order so as to be incident on the beam splitter 103. The light beam incident on the beam splitter 103 is reflected toward and goes through a convex lens 109, and is thereafter split into light beams 111 and 115 by means of a cylindrical polarized beam splitter 110 (hereinafter referred to as a "cylindrical PBS").

The split light beam 111 is converged on a photodetector 112 consisting of several light-sensitive portions, one of which is further divided into two portions. The split light beam 111 is, more specifically, converged on the two divided portions of the photodetector 112. Then, two outputs A and B from the two divided portions are input to corresponding terminals of a differential amplifier 114. Each of the outputs A and B corresponds to the amount of light converged on each of the two divided portions. The differential amplifier 114 conducts an operation for obtaining the difference between the outputs A and B so as to produce a tracking error signal (hereinafter referred to as a "TES").

Such a method for obtaining a TES, in which the TES is defined as a difference between outputs of the differential amplifier 114, is known as a push-pull method, as is disclosed in Japanese Laid-Open Patent Publication No. 49-60702, for example.

The outputs A and B from the two divided portions are also input to a summing amplifier 116. The summing amplifier 116 conducts an operation for obtaining a sum total of the outputs A and B so as to produce a total light amount signal. As for the TES output from the differential amplifier 114, it is input to a variable amplifier 117. The gain of the variable amplifier 117 is so adjusted that the amplitude of the TES is roughly constant at point a. An output from the variable amplifier 117 is input to a divider 118, to which the total light amount signal from the summing amplifier 116 is also input. Accordingly, the divider 118 divides the output from the variable amplifier 117 by the output from the summing amplifier 116, so that the amplitude of the TES is roughly constant against changes in the amount of light during a recording or erasing operation and changes in the reflectance of the disk 107.

The other split light beam 115 from the cylindrical PBS 110 is also converged on the photodetector 112, but it is converged on another light-sensitive portion which is further divided into four portions. A focus error signal (hereinafter referred to as a "FES"), which indicates misconvergence of the light beam incident on the disk 107, is obtained based on outputs from the four divided portions of the photodetector 112. Detection of the FES is conducted by a differential amplifier 113 through an astigmatic method, which is a known technique. Based on the FES, a known focus servo control is conducted by driving a focusing actuator (not shown) so that the light beam incident on the disk 107 is so converged as is prescribed. Since the present invention does not directly relate to focus servo systems, descriptions therefor are omitted.

Next, operation of an optical system as a whole, in cases where tracking servo control is conducted so that the light beam converged by the objective lens 105 is radiated accurately on a given track, will be briefly described with reference to FIG. 21. In the tracking control system shown in FIG. 21, the tracking servo control is conducted by driving the galvano-mirror 130 serving as a fine tracking actuator and/or a linear motor 131 serving as a coarse tracking actuator. The galvano-mirror 130 is driven mainly in response to a TES having a high frequency, while the linear motor 131 is driven mainly in response to a TES having a low frequency. The linear motor 131 is also driven when conducting a search over the whole area of the disk 107, that is, when the light spot travels over the entire disk area.

A TES whose amplitude has been made roughly constant against changes in the light amount of the light beam and changes in the reflectance of the disk 107 by means of the divider 118, as was described earlier, is then input to a phase compensation circuit 121. An output from the phase compensation circuit 121 is input to a driving circuit 128, which drives the galvano-mirror 130. The galvano-mirror 130 is driven so as to rotate by an output from the driving circuit 128, which output corresponds to the TES. As the galvano-mirror 130 rotates, the direction in which the light beam is directed is altered, the light spot traveling across the tracks on the disk 107 so as to be located upon the sought track. (Hereinafter, the direction across the tracks on an optical disk is referred to as the "tracking direction" thereof.) Thus, the light spot is controlled so as to be always located right on the sought track.

The linear motor 131 is capable of moving from the inner periphery to the outer periphery of the disk 107 in the tracking direction thereof. The mirror 104 and the objective lens 105 are mounted on the linear motor 131 so as to form an optical head as a whole. The light spot can travel from the inner periphery to the outer periphery of the disk 107 in the tracking direction in accordance with the movement of the linear motor 131. When tracking servo control is conducted, the output of the phase compensation circuit 121 is input to another phase compensation circuit 123 by way of an equivalent filter circuit 122. The phase compensation circuit 123 is used for controlling the linear motor 131. The equivalent filter circuit 122 has characteristics similar to the input-output characteristics, i.e. input-rotation characteristics, of the galvano-mirror 130 serving as the fine tracking actuator. An output from the phase compensation circuit 123 is input to a driving circuit 129, which drives the linear motor 131. Thus, the linear motor 131 is controlled in such a way that the galvano-mirror 130 rotates from e natural state as a reference posture, the natural state meaning a state where the center axis of the light beam incident on the objective lens 105 coincides with the optical axis of the optical system.

However, in such a construction as that shown in FIG. 21 where the galvano-mirror 130 is used as the fine tracking actuator and is provided in a stationary portion, and the optical head is composed of the linear motor 131 movable in the tracking direction, the mirror 104, and the objective lens 105, the optical path defined as the distance from the galvano-mirror 130 by way of the mirror 104 to the objective lens 105 is long. If the posture of the galvano-mirror 130 in an uncontrolled state (i.e. natural state) changes from an initial state in the direction in which the galvano-mirror 130 gravitates or in the direction in which the galvano-mirror 130 rotates, a deviation of the center axis of the light beam from the optical axis of the optical system (hereinafter, this deviation is referred to as disagreement of optical axes) occurs. A longer optical path tends to increase the scale of the problem. In other words, a longer path increases an offset that a TES is made to have due to such disagreement of optical axes.

Disagreement of optical axes due to change in posture of the galvano-mirror 130 is better illustrated in FIG. 22. As is seen from FIG. 22, when the galvano-mirror 130 rotates counterclockwise, as would be necessitated when tracking servo control is conducted, the disagreement of optical axes occurs, causing the TES to have an offset. Disagreement of optical axes occurs whenever the galvano-mirror 130 is shifted from the initial state shown An FIG. 22. In other words, the disagreement of optical axes occurs even when no servo control As conducted, if the posture of the galvano-mirror 130 is altered because of gravity, etc., as is mentioned above. Such disagreement of optical axes, whether occurring when tracking servo control is conducted or not, causes the TES to have a large offset due to such factors as the spherical aberration of the objective lens 105, the coma of the light beam, and/or an eclipse due to the frame of the lens. If tracking servo control by rotating the galvano-mirror 130 is conducted in such a case, the TES is made to have an added offset.

If the disagreement of optical axes when no tracking servo control is conducted is large, the TES is bound to have a large offset. It may be impossible to remove such an offset in a circuit disposed after the TES is detected, if the TES is so large that the circuit is saturated. Moreover, the amplitude of the TES may become small, or the TES may not appear at all because of an eclipse due to the frame of the objective lens, etc. In cases where the TES does not appear, it is impossible to make it appear even by removing the offset thereof. Furthermore, if the TES has an offset when tracking servo control is conducted, the light spot on the disk 107 is prevented from being located right on the sought track. That is, the light spot on the disk 107 is in an off-track state.

such an off-track state due to rotation of the galvano-mirror 130 during tracking servo control invites the problem of deterioration of the recording characteristics when information is recorded on the disk 107 and/or deterioration of the reproduction characteristics when information carried on the disk 107 is reproduced, since the light spot is likely to get off the track, that is, the tracking accuracy is deteriorated. Moreover, if deterioration with age and/or change in thermal circumstances should change the posture of the galvano-mirror 130 when no tracking servo control is conducted, thereby causing disagreement of optical axes, the TES may have e large offset, or the TES may not appear at all in extreme cases. In such cases, it becomes impossible to lead the tracking servo control system into e stable operation when initiating tracking servo control. That is, the whole tracking servo control system cannot be started, greatly undermining the reliability of the system.

SUMMARY OF THE INVENTION

A tracking control system according to the present invention comprises: converging means for converging a light beam at a point on a recording medium to form a converging spot; transportation means for receiving a driving signal end for moving the converging spot across tracks provided on the recording medium in response to the driving signal; tracking error detecting means for generating a tracking error signal according to a position of the converging spot with respect to one of the tracks; tracking servo control means for generating a first driving signal according to the tracking error signal and for feeding the first driving signal to the transportation means as the driving signal, by which the transportation means is driven so that the converging spot is located on the one track; means for turning on and off the tracking servo control means; driving means for, when the tracking servo control is turned off, generating a second driving signal by which the transportation means is driven so that the converging spot crosses a predetermined number of tracks among the tracks; measuring means for, when the tracking servo control is turned off, measuring e degree of disagreement of optical axes based on the tracking error signal obtained by driving the transportation means with the second driving signal; and correcting means for correcting the disagreement of optical axes by constantly supplying the transportation means with a current for making the degree of disagreement of optical axes substantially zero based on the measured degree of disagreement of optical axes.

In one embodiment of the invention, the transportation means comprises a fine tracking actuator for reflecting the light beam and for moving the converging point by changing a direction in which the light beam is reflected end a coarse tracking actuator for supporting the converging means and for moving the converging spot by moving the converging means, and the correcting means for disagreement of optical axes supplies the fine tracking actuator with a current.

In another embodiment of the invention, the measuring means measures the degree of disagreement of optical axes on the basis of an offset of the tracking error signal.

In still another embodiment of the invention, the measuring means measures the degree of disagreement of optical axes on the basis of an envelope of the tracking error signal.

In still another embodiment of the invention, the driving means is connected to the fine tracking actuator and the fine tracking actuator is driven by the second driving signal.

In still another embodiment of the invention, the driving means is connected to the coarse tracking actuator and the coarse tracking actuator is driven by the second driving signal.

Alternatively, a tracking control system according to the present invention comprises: a rotatable reflecting mirror for reflecting a light beam; converging means for receiving the light beam from the reflecting mirror and for converging the light beam at a point on a recording medium to form a converging spot; first driving means for receiving a first driving signal and for generating and supplying a rotation signal for the reflecting mirror to rotate the reflecting mirror according to the first driving signal, the rotation signal being a first function of the first driving signal; second driving means for receiving a second driving signal and for moving the converging means according to the second driving signal, the second driving means supporting the converging means; tracking error detecting means for generating a tracking error signal according to a position of a converging spot with respect to a track provided on the recording medium; tracking servo control means for generating the first driving signal and the second driving signal according to the tracking error signal so that the converging spot is located on the track; filtering means for generating an output signal as a second function of the tracking error signal, the second function being substantially the same as the first function; and correcting means for correcting an offset of the tracking error signal based on the output signal from the filtering means so that the offset of the tracking error signal becomes substantially zero.

In one embodiment of the invention, the correcting means comprises means for setting a correction amount for making the offset of the tracking error signal substantially zero and for generating a correction signal based on the correction amount and means for receiving the correction signal and for correcting the tracking error signal by using the correction signal.

In another embodiment of the invention, the tracking control system further comprises: means for receiving the corrected tracking error signal from the correcting means and for detecting an intermediate level of the amplitude of the tracking error signal and for deriving a difference between the intermediate level and a preset reference level; and means for adjusting the correction amount according to the difference so that the intermediate level equals the reference level.

In still another embodiment of the invention, the tracking servo control receives the output signal from the filtering means and generates the second driving signal based on the output signal.

According to the above construction, an offset of a TES occurring due to rotation of a galvano-mirror during tracking servo control can be corrected. Therefore, accurate and precise tracking servo control can be conducted, thereby ensuring highly-reliable recording/reproducing characteristics. Moreover, by correcting disagreement of optical axes when no tracking servo control is conducted, it becomes possible to conduct tracking servo control with the optical axis of the optical system always being the reference position of the control, thereby realizing accurate and precise tracking servo control. Furthermore, even if deterioration with age and/or change in thermal circumstances have changed the posture of the galvano-mirror when no tracking servo control is conducted so as to cause the TES to have a large offset or not to appear at all, it becomes possible to make the TES appear by correcting the disagreement of optical axes. Therefore, it becomes possible to always let the whole tracking servo control system start as it is supposed to. Moreover, it becomes possible to lead the tracking servo control system into a stable operation when initiating the tracking servo control by adjusting the offset of the TES. In summary, stable tracking servo control characteristics and searching characteristics are ensured, and it is possible to always let the tracking servo control system start as it is supposed to, greatly improving the reliability thereof.

Thus, the invention described herein makes possible an advantage of providing a highly reliable tracking control system capable of accurate and precise tracking servo control, in which disagreement of optical axes occurring due to variations in initial adjustments of optical heads, deterioration with age, and the like is corrected, and an offset of a TES occurring due to rotation of a galvano-mirror is corrected.

This and other advantages of the present invention will become apparent to those skilled in the art upon reading and understanding the following detailed description with reference to the accompanying figures.

BRIEF DESCRIPTION OF THE DRAWINGS

FIG. 8 is a view for describing the relationship between rotation of a galvano-mirror and disagreement of optical axes.

FIG. 9 is a view for describing the length of an optical path between a galvano-mirror and an objective lens.

FIG. 10 is a view for describing the relationship between the traveling distance of a light spot on a disk and the offset of a TES.

FIG. 11A is a view showing the waveform of a TES when a galvano-mirror is driven by a driving signal from a driving signal generator in the first example of the present invention.

FIGS. 11B(i) and 11B(ii) are is a view showing the AC component of a TES and the waveform of the binarized TES when a galvano-mirror is driven by a driving signal from a driving signal generator in the first example of the present invention.

FIGS. 20A and 20B represent is a Bode diagram for a TRS servo loop of the second example of the present invention.

DESCRIPTION OF THE PREFERRED EMBODIMENTS

Example 1

Figure 1:
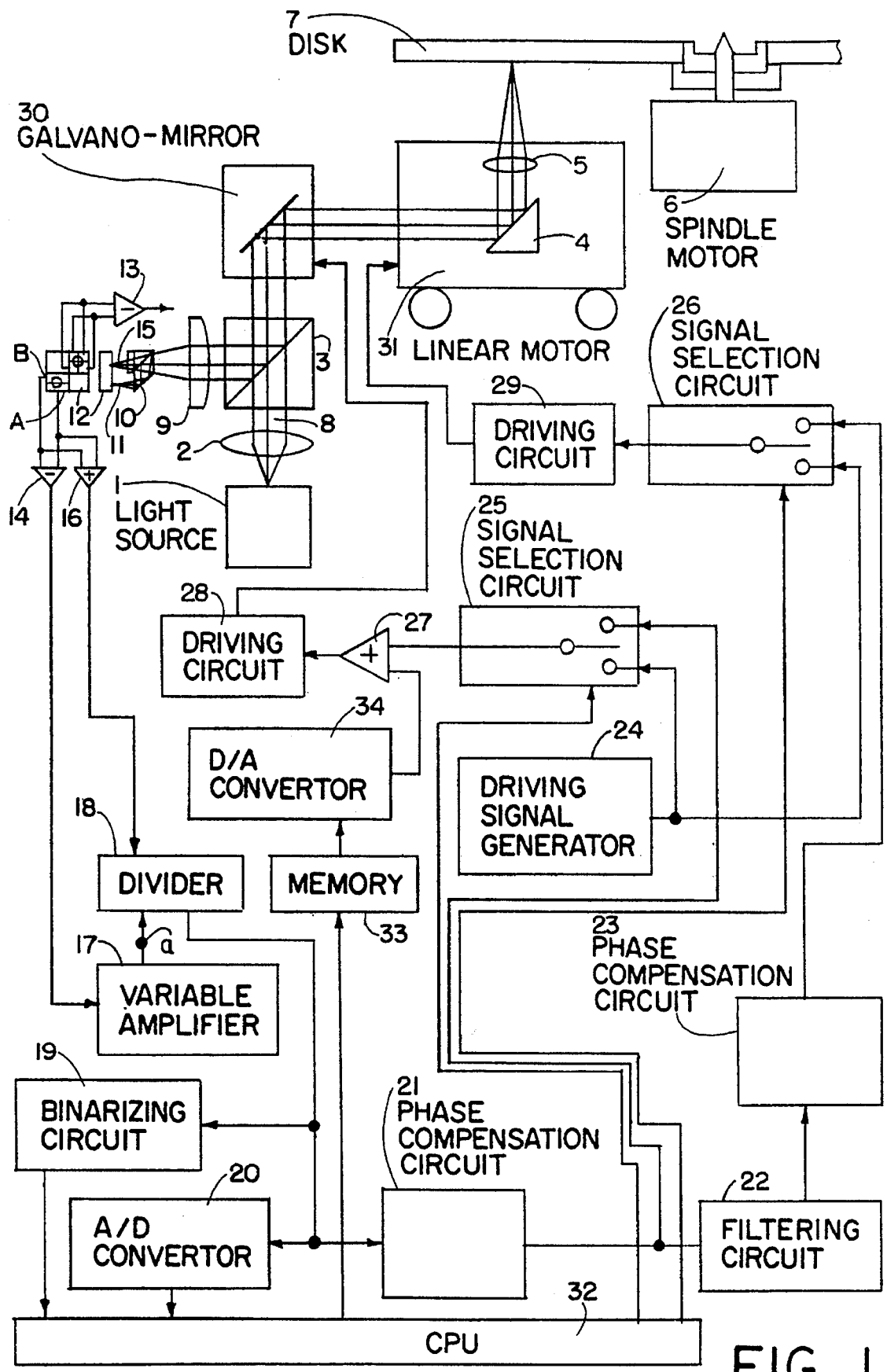
FIG. 1 is a block diagram showing a construction for a tracking control system according to a first example of the present invention.

Hereinafter, a tracking control system according to a first example of the present invention will be described with reference to the accompanying drawings. FIG. 1 is a block diagram showing a construction for the tracking control system.

As is shown in FIG. 1, a light beam 8 emitted from a light source 1 such as a laser diode is collimated by a collimating lens 2, and thereafter goes through a beam splitter 3 so as to be reflected by a galvano-mirror 30 serving as a fine tracking actuator. The light beam reflected by the galvano-mirror 30 is further reflected by a mirror 4 disposed in a movable portion, and is thereafter converged on a rotating disk 7 by means of an objective lens 5. The disk 7 is connected to a spindle motor 6, which rotates the disk 7.

The light beam is reflected by the disk 7, led through the objective lens 5, and thereafter is reflected by the mirror 4 and the galvano-mirror 30 in the respective order so as to be incident on the beam splitter 3. The light beam incident on the beam splitter 3 is reflected toward and goes through a convex lens 9, and is thereafter split into light beams 11 and 15 by means of a cylindrical PBS 10.

The split light beam 11 is converged on a photodetector 12 consisting of several light-sensitive portions, one of which is further divided into two portions. The split light beam 11 is, more specifically, converged on the two divided portions of the photodetector 12. Then, two outputs A and B from the two divided portions are input to corresponding terminals of a differential amplifier 14. Herein, each of the outputs A and B corresponds to the amount of light converged on each of the two divided portions. The differential amplifier 14 conducts an operation for obtaining the difference between the outputs A and B so as to produce a TES. The TES is obtained through a push-pull method.

The outputs A and B from the two divided portions are also input to 8 summing amplifier 16. The summing amplifier 16 conducts an operation for obtaining the sum total of the outputs A and B so as produce a total light amount signal. As for the TES output from the differential amplifier 14, it is input to a variable amplifier 17. The gain of the variable amplifier 17 is so adjusted that the amplitude of the TES is roughly constant at point a. An output from the variable amplifier 17 is input to a divider 18, to which the total light amount signal from the summing amplifier 16 is also input. Accordingly, the divider 18 divides the output from the variable amplifier 17 by the output from the summing amplifier 16, so that the amplitude of the TES is roughly constant against changes in the amount of light during a recording or erasing operation and changes in the reflectance of the disk 7.

The other split light beam 15 from the cylindrical PBS 10 is also converged on the photodetector 12, but it is converged on another light-sensitive portion which is further divided into four portions. An FES, which indicates misconvergence of the light beam incident on the disk 7, is obtained based on outputs from the four divided portions of the photodetector 12. Detection of the FES is conducted by a differential amplifier 13 through an astigmatic method, which is a known technique. Based on the FES, a known focus servo control is conducted by driving a focusing actuator (not shown) so that the light beam incident on the disk 7 is so converged as is prescribed. Since the present invention does not directly relate to focus servo systems, descriptions therefor are omitted.

Figure 2A:
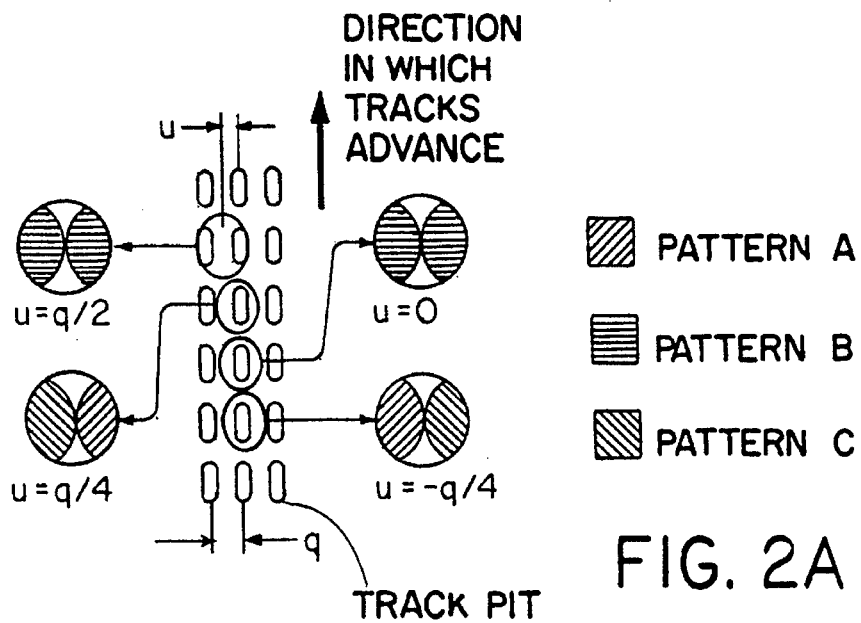
FIG. 2A is a view showing the relationship between tracks of a disk and light spots.

Detection of the TES through a push-pull method will now be described with reference to FIGS. 2A, 2B, and 3. FIG. 2A is a view showing the relationship between tracks of a disk and light spots. More specifically, FIG. 2A shows interference patterns of a zero-order beam and first-order beams of a diffracted light beam when track pit arrays (i.e. tracks) on the disk 7 are seen as a one-dimensional diffraction lattice, while shifting the location of the light spot on the disk 7. The detection of the TES is conducted through a push-pull method. As is shown in FIG. 2A, a relative displacement of the center of the light spot from the center of a track is defined as u, while the track pitch is defined as q. As is seen from FIG. 2A, the right portion and the left portion of each of the interference pattern when u=0 and the interference pattern when u=q/2 are identical. On the other hand, the right portion and the left portion of each of the interference pattern when u=q/4 and the interference pattern when u=−q/4, for example, are inverse with respect to each other. Herein, the intensities of the light beams reflected from the interference patterns A, B, and C, as detected by the photodetector 12, are of the relationship: pattern A>pattern B>pattern C.

Figure 2B:
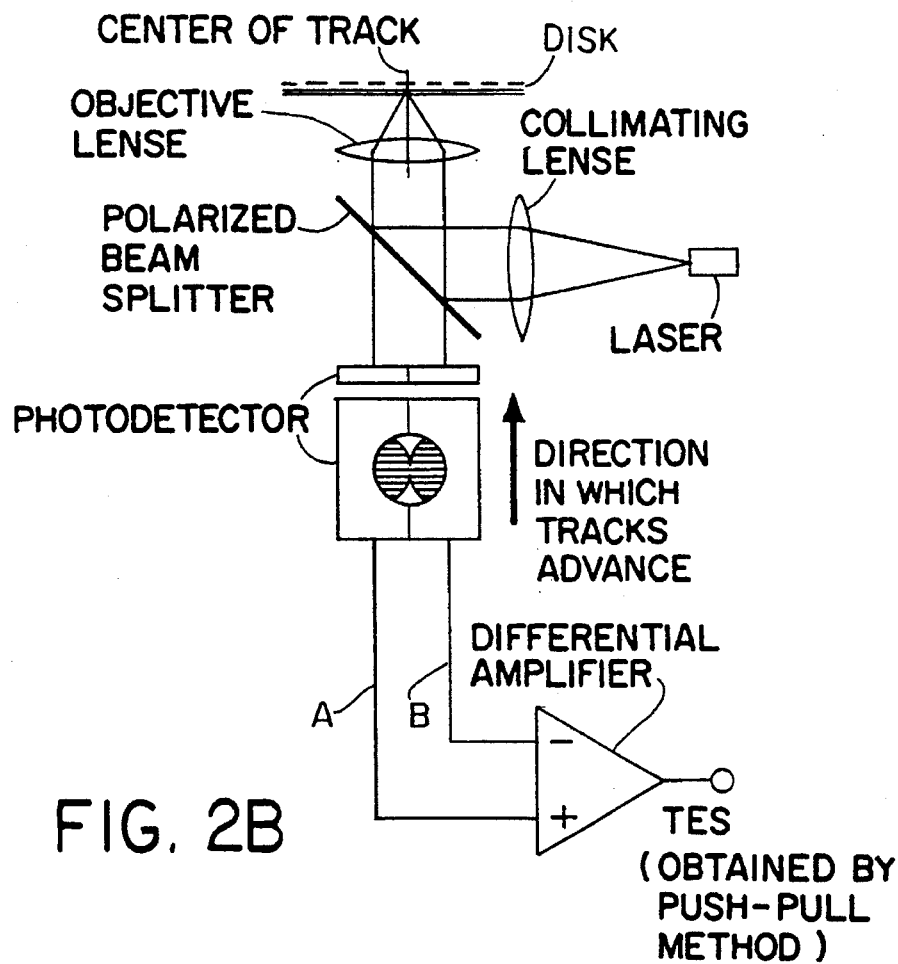
FIG. 2B is a schematic view showing an optical system for detecting a TES.

An optical system for detecting the TES is shown in FIG. 2B. Under the condition that the interference patterns A, B, and C have the above-mentioned relationship, a tracking error of the light spot can be detected by subjecting outputs from the two divided portions of the photodetector 12 to differential detection while disposing the photodetector 12 in such a way that a division line between the two divided portions thereof is disposed in parallel to the tracks on the disk 7.

Figure 3:
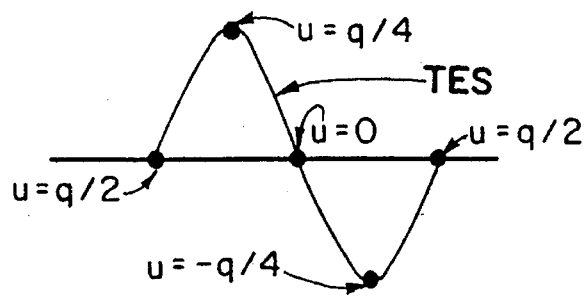
FIG. 3 is a view showing the relationship between the locations of a light spot on a disk and the waveform of a TES.

FIG. 3 shows an exemplary TES obtained through a push-pull method. The point at which u=0 represents a state in which the light spot is located right on a given track, the TES corresponding to the reference level of the control. The point at which u=q/4 is a positive peak of the waveform of the TES. The point at which u=−q/4 is a negative peak thereof. The point at which u=q/2 represents a state in which the light spot is located between two adjoining tracks. In other words, the TES shown in FIG. 3 can be obtained as an output from the differential amplifier 14 processing the outputs from the two divided portions of the photodetector 12 when the light spot travels across the tracks on the disk 7 (i.e., traveling in the tracking direction). Moreover, the outputs from the two divided portions of the photodetector 12 are input to the addition amplifier 16, which generates a total light amount signal corresponding to the amount of the light beam reflected from the disk 7.

Next, operation of an optical system as a whole when tracking servo control is conducted will be briefly described with reference to FIG. 1. In the tracking control system shown in FIG. 1, the tracking servo control is conducted by driving the galvano-mirror 30 serving as a fine tracking actuator and/or a linear motor 31 serving as a coarse tracking actuator. The galvano-mirror 30 is driven mainly in response to a TES having a high frequency, while the linear motor 31 is driven mainly in response to a TES having a low frequency. The linear motor 31 is also driven when conducting a search over the whole area of the disk 7, that is, when the light spot travels over the entire disk area. Such tracking servo control is conducted after correction for the disagreement of optical axes, which will be describe in detail later, and gain adjustment for correcting an offset of the TES are finished so that an offset of the TES occurring due to rotation of the galvano-mirror 30 is corrected.

A TES whose amplitude has been made roughly constant against changes in the light amount of the light beam and changes in the reflectance of the disk 7 by means of the divider 18, as was described earlier, is then input to a phase compensation circuit 21. An output from the phase compensation circuit 21 is input to a driving circuit 28 for driving the galvano-mirror 30, by way of a signal selection circuit 25 and an adder 27. Accordingly, the galvano-mirror 30 is driven so as to rotate by an output from the driving circuit 28, whose output corresponds to the TES. As the galvano-mirror 30 rotates, the direction in which the light beam is directed changes, the light spot thus traveling across the tracks (i.e. in the tracking direction) on the disk 7 so as to be located upon the sought track. Thus, the light spot is controlled so as to be always located right on a given track.

The linear motor 31 is capable of moving from the inner periphery to the outer periphery of the disk 7 in the tracking direction thereof. The mirror 4 and the objective lens 5 are mounted on the linear motor 31 so as to form an optical head as a whole. The light spot can travel from the inner periphery to the outer periphery of the disk 7 in the tracking direction in accordance with the movement of the linear motor 31. When tracking servo control is conducted, the output of the above-mentioned phase compensation circuit 21 is input to the linear motor 31 by way of an equivalent filter circuit 22, a phase compensation circuit 23 for the linear motor controlling system, a signal selection circuit 26, and a driving circuit 29, so that the galvano-mirror 30 can rotate from the natural state as a reference posture. The equivalent filter circuit 22 has characteristics similar to the input-output characteristics, i.e. input-rotation characteristics, of the galvano-mirror 30 serving as the fine tracking actuator.

Next, the relationship between disagreement of optical axes and an offset of a TES will be described with reference to FIGS. 4A to 9.

The configuration of the objective lens 5 is rotation-symmetrical around a certain reference axis. The center of curvature of the spherical surface of the objective lens 5 coincides with the reference axis. This reference axis is referred to as the optical axis of the objective lens 5, The optical axis of the objective lens 5 is also the optical axis of the whole optical system. The same image can be converged even if the optical system is rotated around the optical axis.

Figure 5:
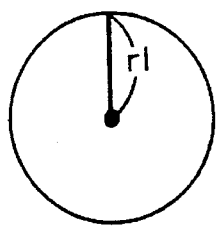
FIG. 5 is a view showing the shape of a light spot when no disagreement of optical axes is occurring.

FIG. 5 shows a cross-section of a light beam incident on objective lens 5, taken vertically with respect to the optical axis thereof, in cases where the optical axis of the objective lens 5 and the center axis of the incident light beam coincide with each other. In other words, FIG. 5 shows the shape of a light spot on the disk 7 when no disagreement of optical axes is occurring. The spreading of the light beam which actually goes through the optical system is restricted by diaphragms, the frames of lenses, etc., and receives different influences depending on whether a focal point As on the optical axis or not. If the optical system is rotation-symmetrical around the optical axis, so is the light beam that goes therethrough, the center axis of the light beam coinciding with the optical axis. In this case, the cross-section of the light beam taken vertically with respect to the optical axis is circular, as is shown in FIG. 5. However, if the center axis of the light beam deviates from the optical axis of the optical system, it becomes impossible for the light beam to be converged in one spot because of the spherical aberration of the objective lens 5.

Figure 6:
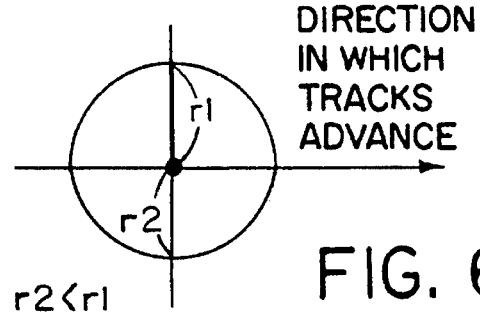
FIG. 6 is a view showing a change in the shape of a light spot owing to aberrations, an eclipse due to a frame of a lens, and the like occurring due to disagreement of optical axes.

A case where the light beam incident on the objective lens 5 constitutes an angle with the optical axis of the optical system will be described, with reference to FIG. 6. FIG. 6 shows a cross-section of a light beam incident on the objective lens 5, taken vertically with respect to the optical axis thereof and taken at the same point in the optical axis as in FIG. 5. The light beam incident on the objective lens 5 in FIG. 6 constitutes an angle with the optical axis of the optical system. In this case, the light beam is, as it were, in a state where it goes obliquely through a circular hole having a certain thickness. As a result, the cross-section of the light beam is no longer circular. Moreover, the area of the cross-section is reduced owing to an eclipse due to the frames of lenses. In other words, the light beam inevitably has a coma when the light beam enters the objective lens 5 obliquely with respect to the optical axis of the optical system. In summary, disagreement of optical axes is likely to affect the shape of the light spot on the disk 7 owing to the spherical aberration of the objective lens 5, the coma of the incident light beam, an eclipse due to the frames of lenses, etc.

Figure 4A:
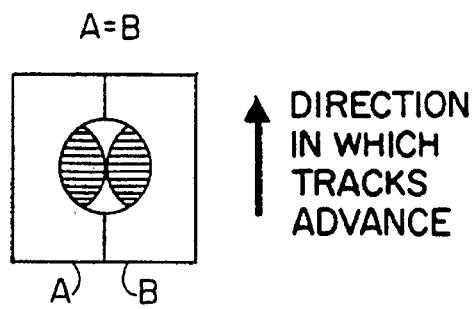
FIG. 4A is a view showing the shape of a light spot on a photodetector when the light spot is located right on a track, with no disagreement of optical axes occurring.
Figure 4B:
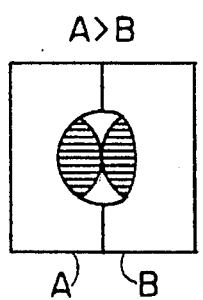
FIG. 4B is a view showing the shape of a light spot on a photodetector when the light spot is located right on a track, with disagreement of optical axes occurring toward the outer periphery of a disk.
Figure 4C:
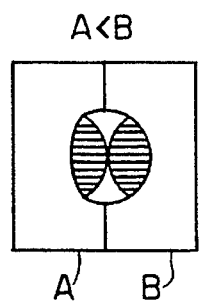
FIG. 4C is a view showing the shape of a light spot on a photodetector when the light spot is located right on a track, with disagreement of optical axes occurring toward the inner periphery of a disk.

FIGS. 4A to 4C are views showing the relationship between disagreement of optical axes and the shape of a light spot on the photodetector 12. FIG. 4A is a view showing the shape of a light spot on the photodetector 12 when the light spot is located right on a track, with no disagreement of optical axes occurring. FIG. 4B is a view showing the shape of a light spot on the photodetector 12 when the light spot is located right on a track, with disagreement of optical axes occurring toward the outer periphery of the disk 7. FIG. 4C is a view showing the shape of a light spot on the photodetector 12 when the light spot is located right on a track, with disagreement of optical axes occurring toward the inner periphery of the disk 7.

When no disagreement of optical axes is occurring, the light beam reflected from the disk 7 forms a light spot having a shape shown in FIG. 4A on the photodetector 12. In this case, the outputs a and B of the photodetector 12 are equal to each other. When disagreement of optical axes is occurring, on the other hand, the light spot on the photodetector 12 has a shape shown in FIG. 4B or 4C, even though the light spot is located right on a given track on the disk 7. In this case, the outputs A and B are not equal, so that the TES has an offset.

Figure 7:
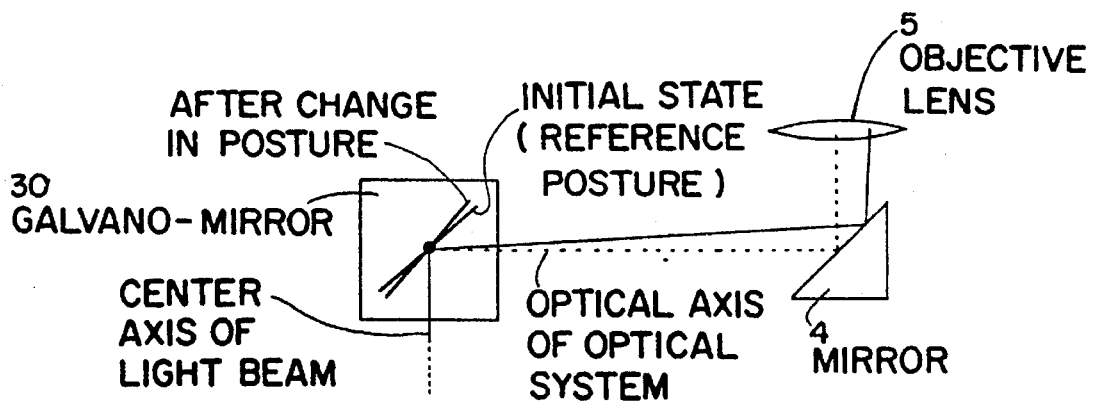
FIG. 7 is a view illustrating disagreement of optical axes due to a change in the posture of a galvano-mirror.

FIG. 7 shows disagreement of optical axes when the posture of the galvano-mirror 30 has shifted in the direction of rotation thereof. If the galvano-mirror 30 rotates counterclockwise from an initial state defined as a posture thereof when no disagreement of optical axes is occurring, the center axis of the light beam deviates from the optical axis of the optical system.

The relationship between disagreement of optical axes, the rotation angles of the galvano-mirror 30, and the length of the optical path from the galvano-mirror 30 to the objective lens 5 will be described with reference to FIGS. 8 and 9. FIG. 8 illustrates the relationship between a rotation angle θ of the galvano-mirror 30, a length L of the optical path from the galvano-mirror 30 to the objective lens 5, an amount $\delta_x$ of deviation of the center axis of the light beam from the optical axis of the optical system (which can also be expressed as a degree of disagreement of optical axes), and a traveling distance x of the light spot on the disk 7. FIG. 9 illustrates the relationship between a distance $L_1$ between the galvano-mirror 30 and the mirror 4, a distance $L_2$ between the mirror 4 and the objective lens 5, and the length L of the optical path from the galvano-mirror 30 to the objective lens 5.

The rotation angle θ of the galvano-mirror 30, the length L of the optical path, the amount $\delta_x$ of deviation of the center axis of the light beam from the optical axis of the optical system, and the traveling distance x of the light spot satisfy the following relationships (1), (2), (3), (4), and (5)

$$L=L_1+L_2 \tag{1}$$

The equation (1) suggests that the length L of the optical path from the galvano-mirror 30 to the objective lens 5 is equal to a sum total of the distance $L_1$ between the galvano-mirror 30 and the mirror 4 and the distance $L_2$ between the mirror 4 and the objective lens 5.

$$f=3 \text{ mm} \tag{2}$$

In the equation (2), the letter f represents the focal distance of the objective lens 5.

$$f \cdot \sin(2\theta)=x \tag{3}$$

The equation (3) represents the relationship between the focal distance f of the objective lens 5, the rotation angle θ, and the traveling distance x of the light spot on the disk 7.

$$2\theta A \sin(x/f) \tag{4}$$

The equation (4) is obtained by resolving the equation (3) with respect to an angle 2θ, which is twice as large as the rotation angle θ of the galvano-mirror 30.

$$\delta_x=L_{max} \cdot \tan(2\theta) \tag{5}$$

The equation (5) represents the relationship between, the amount $\delta_x$ of deviation of the center axis of the light beam from the optical axis of the optical system, a maximum length $L_{max}$ of the optical path, and the rotation angle θ of the galvano-mirror 30. In the present example, the maximum length $L_{max}$ of the optical path is 70 mm. When the galvano-mirror 30 rotates by an angle of ±0.0955°, for example, the light spot travels a distance of ±10 μm on the disk 7, according to the equations (2) and (3). Therefore, the amount $\delta_x$ of deviation of the center axis of the light beam from the optical axis of the optical system is derived from the equation (5) to be ±0.233 mm.

FIG. 10 shows a TES when no disagreement of optical axes is occurring, i.e. a reference TES, and a TES when the light spot has traveled 10 μm on the disk 7. Under the condition that the amplitude of a TES is ±1, the TES has an offset of ±0.6435 when the center axis of the light beam deviates ±0.233 mm from the optical axis of the optical system. When the TES has an offset of ±0.6435, the tracking servo control system locates the light spot at a distance of ±0.178 μm from the center of a sought track. As has been described, the offset of the TES increases as the maximum length $L_{max}$ of the optical path from the galvano-mirror 30 to the objective lens 5 increases.

Next, detection of deviation of the center axis of the light beam from the optical axis of the optical system, i.e. disagreement of optical axes, and correction for a detected disagreement of optical axes will be described with reference to FIG. 1 and FIGS. 11A to 15. Correction for disagreement of optical axes comes in two types: one is a coarse correction where disagreement of optical axes is detected and/or corrected by driving the galvano-mirror 30; the other is a fine correction where disagreement of optical axes is detected and/or corrected by driving the linear motor 31.

Coarse correction is conducted in the following cases: When the center axis of the light beam drastically deviates from the optical axis of the optical system due to a change in the posture of the galvano-mirror 30 so that the center axis of the light beam is shifted to the vicinity of the circumference of the objective lens 5, the light beam incident on the disk 7 and the light beam reflected from the disk 7 are likely to be affected by an eclipse and the like occurring due to the frame of the objective lens 5. As a result, one of the outputs A and B becomes dominant, so that the TES hardly appears. In such cases, it becomes impossible to lead the tracking servo control system into a stable operation, that As, it becomes impossible to start the whole tracking control system. Therefore, coarse correction for the disagreement of optical axes must first be conducted.

First, detection of disagreement of optical axes is conducted in a state where no tracking servo is conducted (hereinafter, this state may also be referred to as "a state where tracking servo control is off"). A CPU 32 switches The signal selection circuit 25 into a mode where the signal selection circuit 25 receives a driving signal from a driving signal generator 24. In this mode, a driving signal from the driving signal generator 24 is input to the driving circuit 28 by way of the signal selection circuit 25 and the adder 27 whereby the galvano-mirror 30 is rotated so that the light spot travels over a prescribed region of the disk 7. The signal selection circuit 26 connected to the driving circuit 29 for driving the linear motor 31 is in a mode for selecting a signal from the phase compensation circuit 23. The linear motor 31 is turned off.

Figures 14, 15:
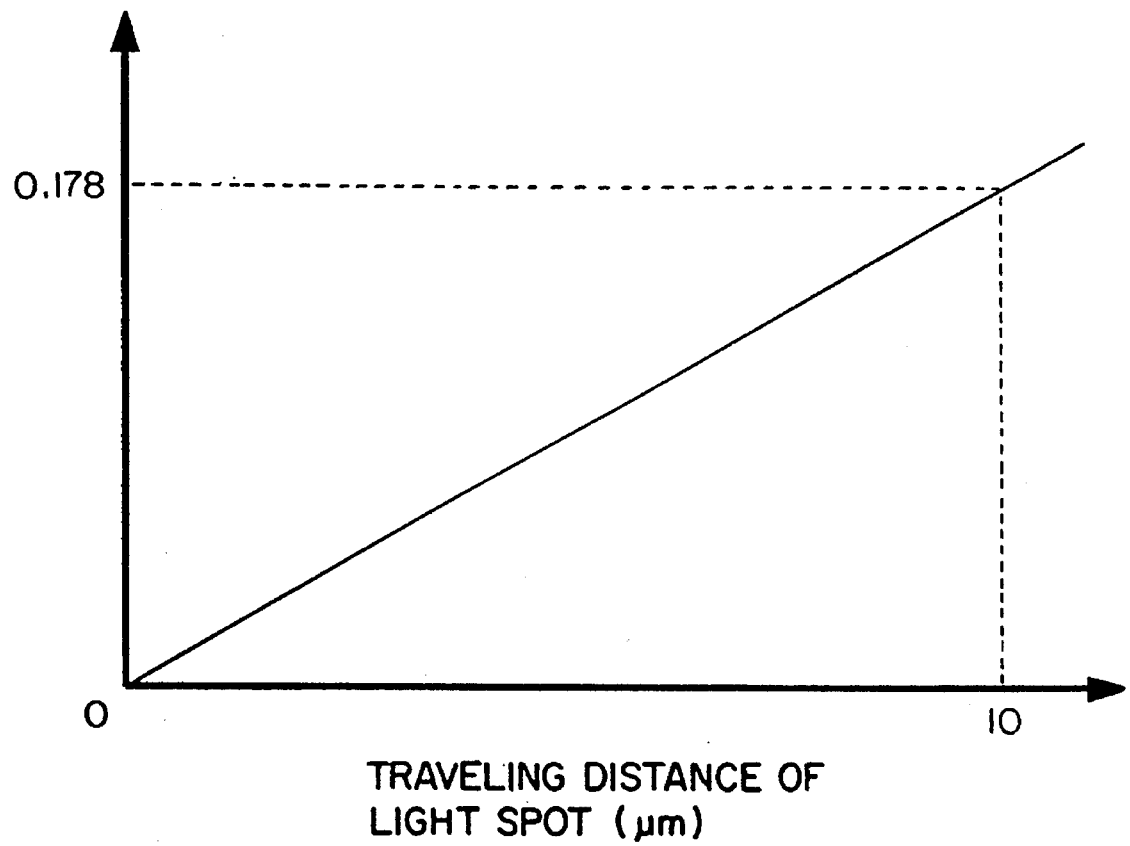
FIG. 14 is a graph showing a characteristic curve between the traveling distance of a light spot and the offset of a TES.
FIG. 15 is a view showing the waveform of a driving signal from a driving signal generator used for driving a galvano-mirror and a linear motor in the first example of the present invention.

FIG. 15 shows an exemplary driving signal from The driving signal generator 24. An intermediate level of the amplitude of this driving signal corresponds to a reference voltage ($V_{ref}$). When the driving signal is at $V_{ref}$, no current flows to the galvano-mirror 30 (or to the linear motor 31 in the case of fine correction). Driving the galvano-mirror 30 with such a driving signal results in a TES shown in FIG. 11A. FIG. 11A shows the waveform of a TES when the galvano-mirror 30 is driven by a sine-wave driving signal. Since a TES has en offset when disagreement of optical axes occurs due to rotation of the galvano-mirror 30 as is shown in FIG. 11A, the TES can be made to appear by rotating the galvano-mirror 30 even when the disagreement of optical axes is so large that almost no TES appears.

Moreover, in cases where the disk 7 is eccentric, the light spot on the disk 7 may get off the track when the disk 7 rotates, even if the galvano-mirror 30 and the linear motor 31 are located stationarily at the same position. For example, if the disk 7 rotates at a rate of 3600 r.p.m., an eccentricity component of 60 Hz appears. Accordingly, the frequency of the driving signal is prescribed to be 1 kHz in the present example so that the influence of the possible eccentricity of the disk 7 is minimized.

As is described above, the galvano-mirror 30 As rotated in such a way that a TES having the same amplitude as that of a TES when no disagreement of optical axes is occurring can be obtained. The TES thus obtained is subjected to a gain control by the divider 18, and then input to an A/D convertor 20 and a TES binarizing circuit 19. The TES input to the A/D convertor 20 is digitalized thereby, and then input to the CPU 32. In the mean time, the TES binarizing circuit 19 digitalizes an AC component Of the TES, thus binarizing the TES. An output from the TES binarizing circuit 19 is input to the CPU 32. The waveform of the AC component of the TES and the binarized TES are shown in FIGS. 11B(i) and 11B(ii).

The digitalized TES and the binarized TES are input to the CPU 32. The CPU 32 calculates out the offset characteristics or envelope characteristics of the TES based on the digitalized TES and the binarized TES. A correction value is derived based on the offset characteristics or envelope characteristics of the TES thus obtained. The correction value is set in memory 33. The memory 33 outputs a signal which is in accordance with the correction value. The signal output by the memory 33 is converted to an analog signal by a D/A convertor 34 and added to an output from the signal selection circuit 25 by the adder 27. Thus, a current which is in accordance with the correction value flows to the galvano-mirror 30.

The correction value is so determined that, for example, the offset characteristics of the TES become symmetrical with respect to a point where the TES intersects $V_{ref}$ when the current flows to the galvano-mirror 30. The correction value can also be so determined that the envelope characteristics of the TES become symmetrical with respect to the point where the TES intersects $V_{ref}$. The CPU 32 keeps updating the correction value set in the memory 33 until the offset characteristics or envelope characteristics of the TES become symmetrical with respect to the point where the TES intersects $V_{ref}$, when the CPU 32 finally sets the correction value in the memory 33. The correction value, once stored in the memory 33, is not updated until a next correction for disagreement of optical axes is conducted.

Figure 12:
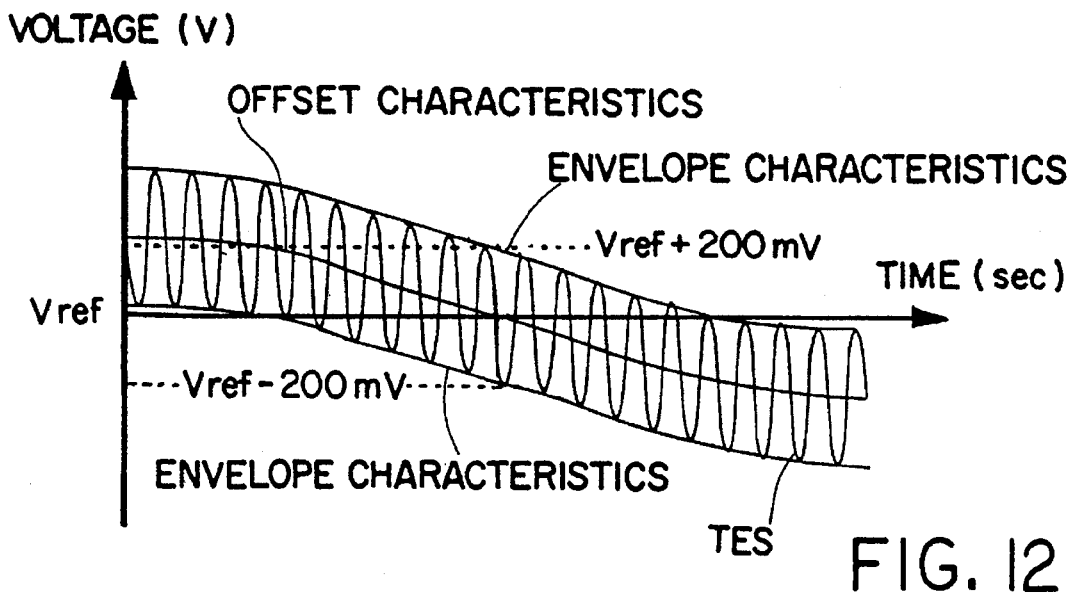
FIG. 12 is a view showing the offset characteristics and the envelope characteristics of a TES when a galvano-mirror is driven by a driving signal from a driving signal generator in the first example of the present invention.

The center axis of the light beam and the optical axis of the optical system are made to coincide with each other by constantly letting a current flow to the galvano-mirror 30, the current being based on the correction value so determined and set in the memory 33. FIG. 12 shows the waveform of the TES when the galvano-mirror 30 is driven in such a way that the light spot travels over a region of the disk 7 where the light spot traveled during the coarse correction.

Figure 13A:
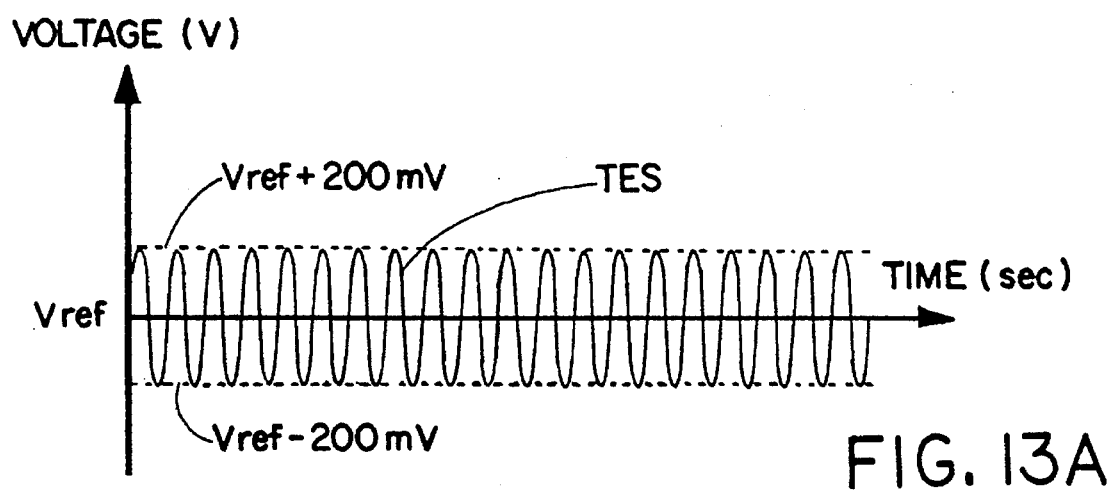
FIG. 13A is a view showing the waveform of a TES when a linear motor is driven by a driving signal from a driving signal generator and no disagreement of optical axes is occurring An the first example of the present invention.
Figure 13B:
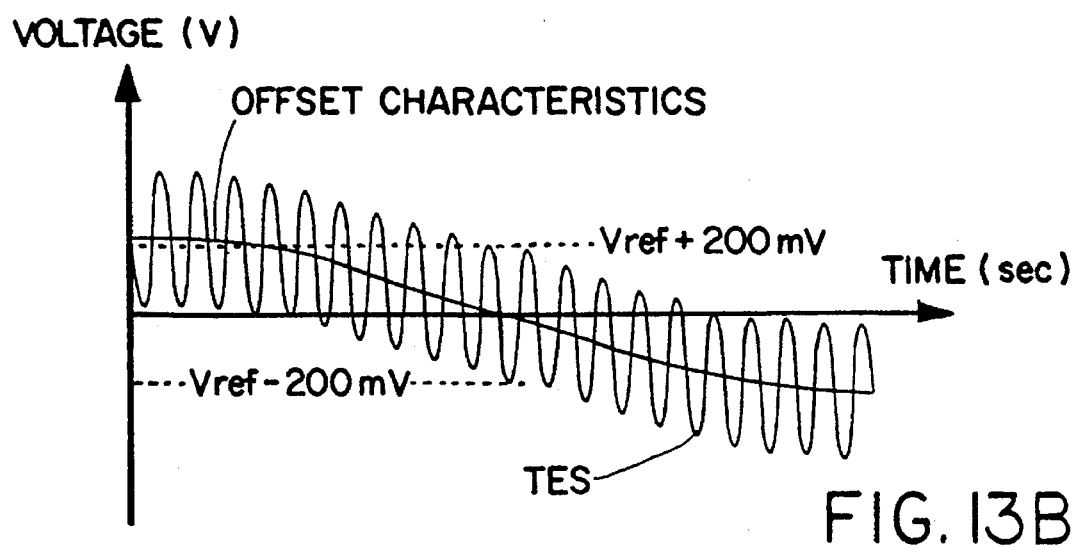
FIG. 13B is a view showing the waveform of a TES when a linear motor is driven by a driving signal from a driving signal generator and disagreement of optical axes is occurring in the first example of the present invention.

Next, fine correction will be described with reference to FIG. 13B. FIG. 13B shows the waveform of a TES when the linear motor 31 is driven by a driving signal, which is a sine wave signal, from the driving signal generator 24. If the light spot is shifted from the inner periphery of the disk 7 to the outer periphery thereof by driving the linear motor 31 after the above-mentioned coarse correction has been conducted, the polarity of the offset of the TES may change as the light spot travels from the inner periphery to the outer periphery of the disk 7, as is shown in FIG. 13B; this happens when the coarse correction for disagreement of optical axes was not accurately conducted. In such cases, fine correction must subsequently be conducted so that the variation of the offset of the TES when the light spot travels from the inner periphery to the outer periphery of the disk 7 becomes minimum.

The fine correction is conducted with the servo control being turned off and after coarse correction is completed. More specifically, the fine correction is conducted by driving the linear motor 31 with a driving signal from the driving signal generator 24 so as to obtain a TES. The signal selection circuit 26 is in a mode for selecting a signal from the driving signal generator 24, and the signal selection circuit 25 is in a mode for selecting a signal from the phase compensation circuit 21. Thereafter, the CPU 32 keeps updating a correction value which it sets in the memory 33 until the center axis of the light beam coincides with the optical axis of the optical system, when the CPU 32 finally sets the correction value in the memory 33. The center axis of the light beam can be made to coincide fairly precisely with the optical axis of the optical system by constantly letting a current flow to the galvano-mirror 30 based on the correction value finally stored in the memory 33.

Correction for disagreement of optical axes will be briefly described with reference to FIG. 7. When the disagreement of optical axes is occurring due to such a change in the posture of the galvano-mirror 30 as shown in FIG. 7, the center axis of the light beam and the optical axis of the, optical system can be made to coincide with each other by rotating the galvano-mirror 30 by an angle which the galvano-mirror 30 constitutes with an initial state thereof. FIG. 13A illustrates a TES when the disagreement of optical axes is completely corrected, the linear motor 31 being driven by a driving signal from the driving signal generator 24.

Hereinafter, the above-mentioned detection of disagreement of optical axes will be described in more detail. The detection of disagreement of optical axes is conducted based on a TES. More specifically, the TES is subjected to an automatic gain control by the divider 18, and thereafter is digitalized by the A/D convertor 20 and at the same time binarized by the TES binarizing circuit 19. The CPU 32 conducts an operation for determining the degree of the disagreement of optical axes based on the digitalized TES and the binarized TES.

An exemplary operation for determining disagreement of optical axes will be described. First, the galvano-mirror 30 or the linear motor 31 is driven so that a TES is obtained, the TES being subjected to an automatic gain control by the divider 18. The TES is digitalized by the A/D convertor 20 and at the same time binarized by the TES binarizing circuit 19. The digitalized TES and the binarized TES are input to the CPU 32. The CPU 32 derives maximal values and minimal values of the TES based on the digitalized TES and the binarized TES. Then, the CPU 32 derives the amplitude of the TES based on the maximal values and the minimal values of the TES. Finally, the CPU 32 measures the offset characteristics of the TES based on the difference between the intermediate level of the amplitude of the TES and $V_{ref}$. Then, the CPU 32 determines a correction value which will cause the galvano-mirror 30 to rotate in a direction for canceling the offset of the TES when the driving signal for driving the galvano-mirror 30 or the linear motor 31 is zero. The determined correction value is then set in the memory 33. The memory 33 outputs a digital signal which is in accordance with the correction value. The digital signal is converted into a voltage by the D/A convertor 34. The voltage thus obtained is added to an output from the signal selection circuit 25 by the adder 27. In other words, the galvano-mirror 30 receives a current from the driving circuit 28 which is in accordance with the correction value while receiving a driving signal from the driving signal generator 24. The CPU 32 keeps updating a value set in the memory 33 until the offset of the TES when the driving signal is zero becomes substantially zero. A value when the offset of the TES is substantially zero is finally stored in the memory 33 as a correction value for disagreement of optical axes. Thus, the correction value for disagreement of optical axes has been obtained based on the offset characteristics of the TES.

There are various other methods for obtaining the correction value for disagreement of optical axes based on the offset of the TES. For example, it is possible to obtain the correction value directly from the offset of the TES before the current is started to flow to the galvano-mirror 30, by discovering a function between disagreement of optical axes and the offset of the TES.

FIG. 14 shows change in the offset of a TES according to the traveling distance of the light spot on the disk 7 as the galvano-mirror 30 is rotated. The galvano-mirror 30 is rotated while ensuring that the center axis of the light beam and the optical axis of the optical system coincide with each other when the tracking servo control is off. As a result, an offset of about 0.178 μm is generated as the light spot travels for 10 μm, as is seen from FIG. 14. The offset characteristics of the TES are substantially linear until the traveling distance of the light spot reaches about 30 μm, and is in proportion with the traveling distance of the light spot. Accordingly, the correction value for disagreement of optical axes can directly be derived from the offset of the TES.

Another exemplary operation for determining disagreement of optical axes will be described. As in the first exemplary operation, the galvano-mirror 30 or the linear motor 31 is driven so that a TES is obtained. The TES is digitalized by the A/D convertor 20 and at the same time binarized by the TES binarizing circuit 19. The digitalized TES and the binarized TES are input to the CPU 32.

The CPU 32 measures maximal values of the TES so as to obtain an upper envelope (i.e. envelope on the side of the positive peaks) for the TES. The CPU 32 also measures minimal values of the TES to as to obtain a lower envelope (i.e. envelope on the side of the negative peaks) for the TES. Thereafter, while monitoring the TES, the galvano-mirror 30 or the linear motor 31 is driven in such a way that the light spot travels across about ±10tracks on the disk 7 starting from an initial position at which the driving signal generated from the driving signal generator 24 is zero. In this method, the center axis of the light beam and the optical axis of the optical system are considered to be coinciding with each other when (a) the maximal value of the TES at +8 track (i.e. where the light spot has traveled +8 tracks from the initial state) and the minimal value of the TES at −8 track (i.e. where the light spot has traveled −8 tracks from the initial state) are symmetrical with respect to $V_{ref}$, and when (b) the minimal value of the TES at +8 track and the maximal value of the TES at −8 track are symmetrical with respect to $V_{ref}$. The tracks are counted by counting the edges of the binarized TES, which process is conducted by the CPU 32.

Then, as in the first exemplary operation, a current which constantly flows to the galvano-mirror 30 is adjusted by varying a correction value set by the CPU 32, whereby the galvano-mirror 30 is rotated in such a way that the center axis of the light beam and the optical axis of the optical system coincide with each other. A correction value when the center axis of the light beam and the optical axis of the optical system coincide with each other is stored in the memory 33 as the correction value for disagreement of optical axes. Thus, the correction value for disagreement of optical axes has been obtained based on the envelope characteristics of the TES.

It is also possible to discover a function between the envelope characteristics of the TES and the disagreement of optical axes in a similar manner to that in the first exemplary operation, since the difference between the upper envelope and the lower envelope of the TES is merely a value twice as large as the offset of the TES when the driving signal for the galvano-mirror 30 or the linear motor 31 is zero. Therefore, the correction value for disagreement of optical axes can directly be derived from the envelope characteristics of the TES in the same manner as it is derived from the offset characteristics of The TES.

As has been described, a correction value for disagreement of optical axes can be obtained based on the offset characteristics or envelope characteristics of a TES when driving the galvano-mirror 30 or the linear motor 31 with the Tracking servo control being turned off. Disagreement of optical axes can be corrected by constantly letting a current (which is in accordance with The correction value) flow to The galvano-mirror 30. Thus, accurate and precise tracking servo control can be conducted, where the optical axis of the optical system is a reference position of the control.

Although a linear motor was used as the coarse tracking actuator in the above example, a swing arm or the like may alternatively be used instead of the linear motor, as long as a galvano-mirror is used as the fine tracking actuator.

Example 2

Hereinafter, a tracking control system according to a second example of the present invention will be described with reference to the accompanying drawings. In the second example, tracking servo control is conducted in the same manner as in the first example.

A method for correcting the offset of a TES according to the present example will be described with reference to FIGS. 16 to 18C.

Figure 16:
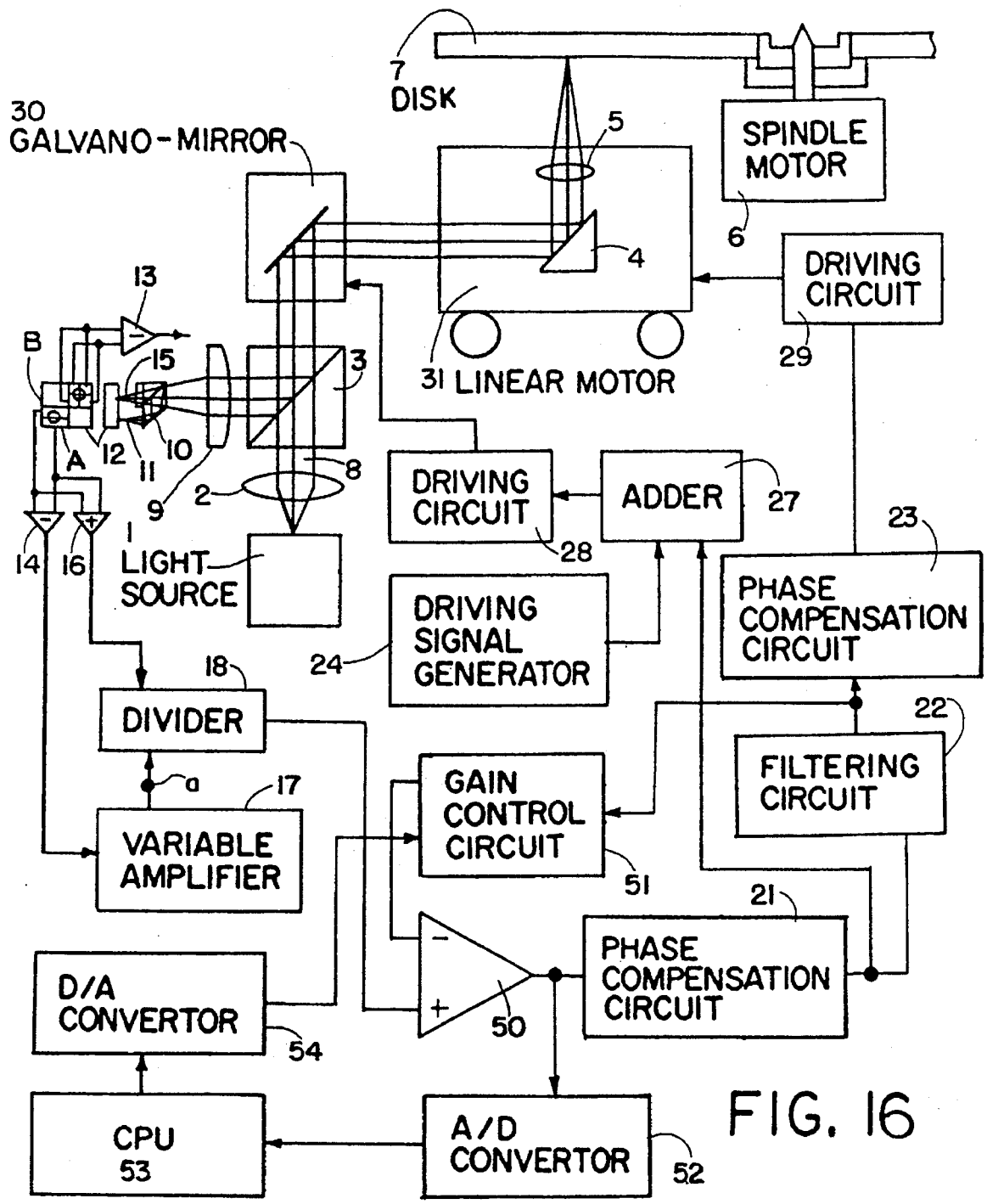
FIG. 16 is a block diagram showing a construction for a tracking control system according to a second example of the present invention.
Figure 17A:
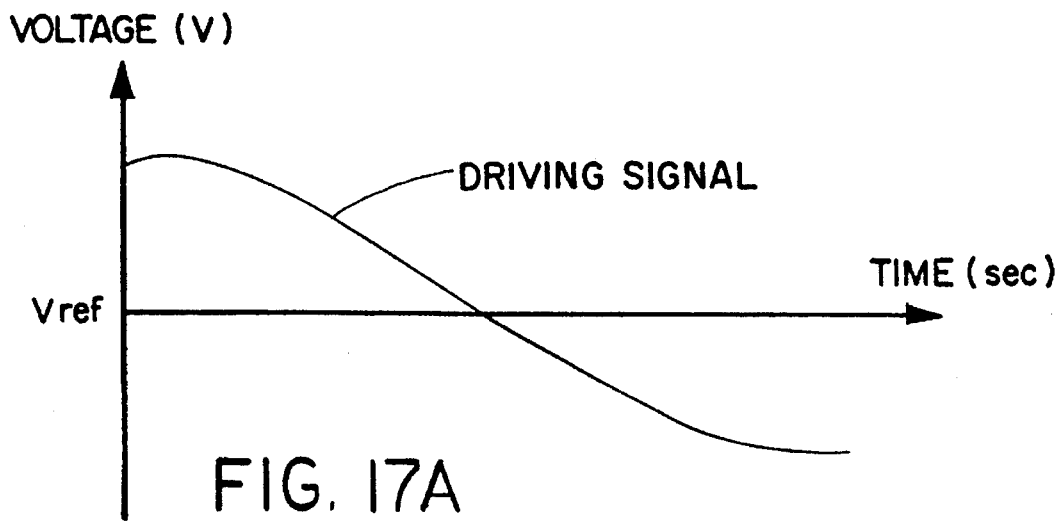
FIG. 17A is a view showing the waveform of a sine wave signal for driving a galvano-mirror in the second example of the present invention.
Figure 17B:
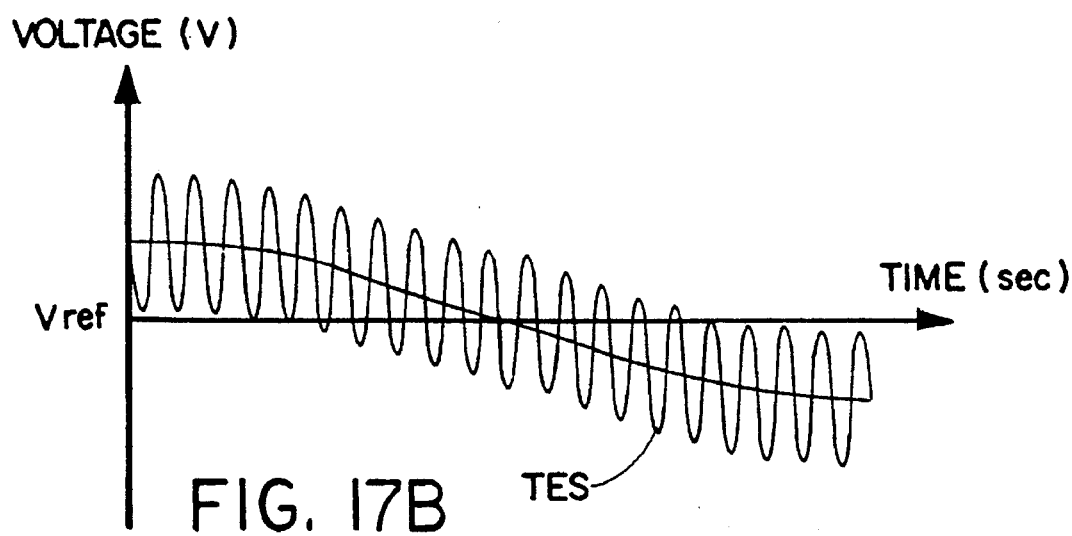
FIG. 17B is a view showing the waveform of a TES, the offset of which is not corrected, when the galvano-mirror is driven by the sine wave signal.
Figure 17C:
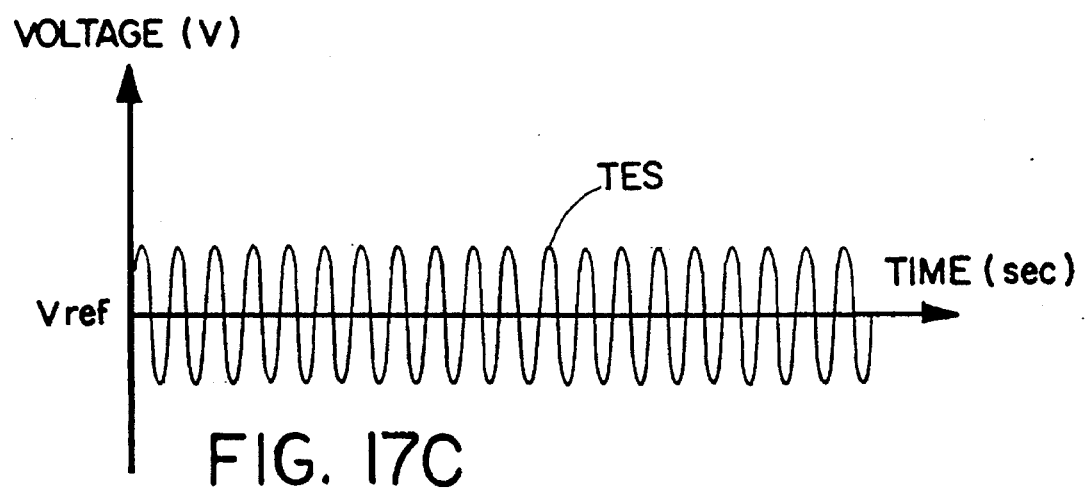
FIG. 17C is a view showing the waveform of a TES, the offset of which is corrected, when the galvano-mirror is driven by the sine wave signal.
Figure 18A:
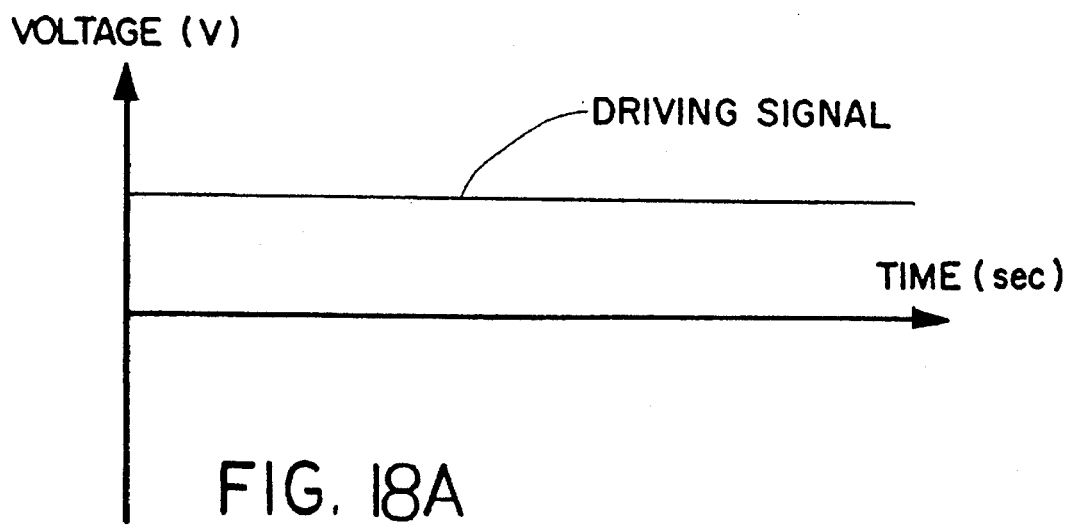
FIG. 18A is a view showing a DC driving signal for driving a galvano-mirror in the second example of the present invention.
Figure 18B:
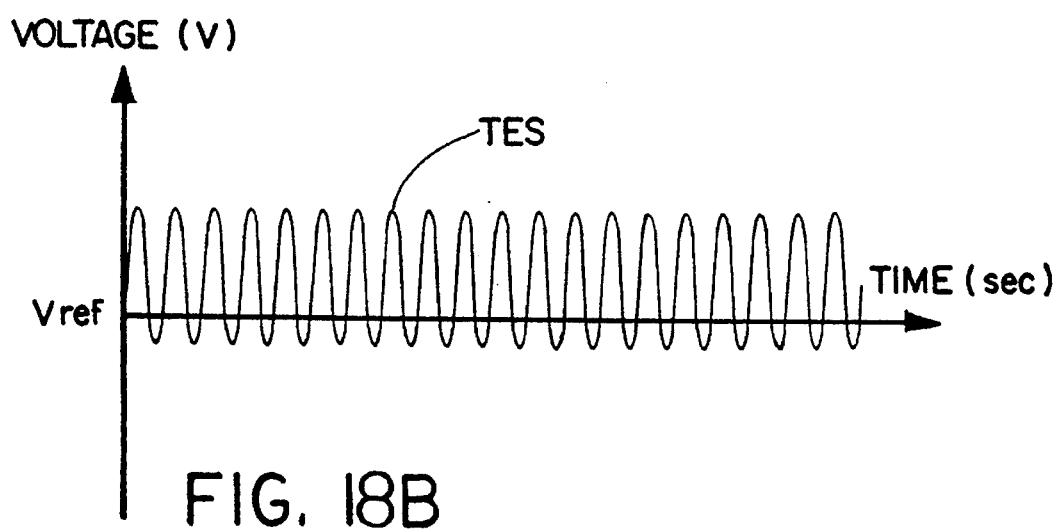
FIG. 18B is a view showing the waveform of a TES, the offset of which is not corrected, when the galvano-mirror is driven by the DC signal.
Figure 18C:
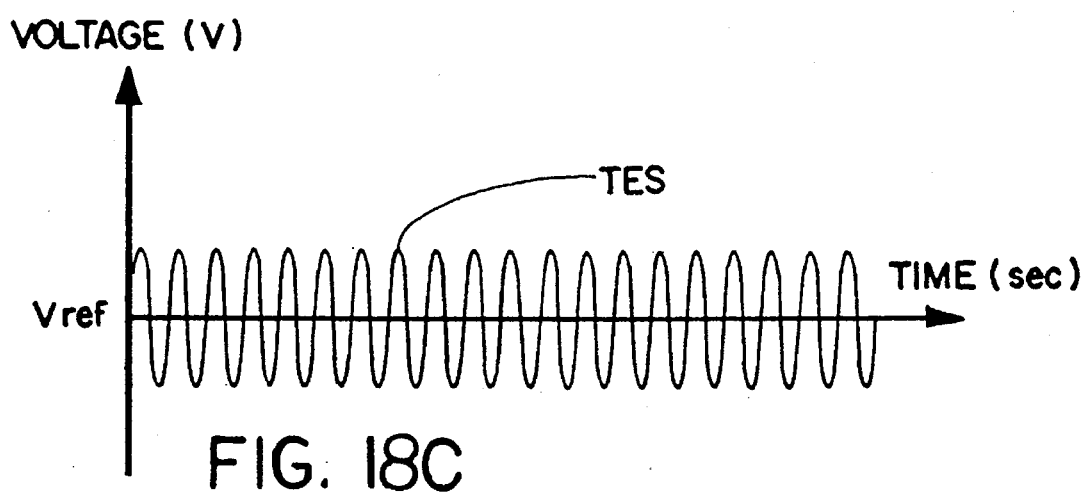
FIG. 18C is a view showing the waveform of a TES, the offset of which is corrected, when the galvano-mirror is driven by the DC signal.
Figure 19A:
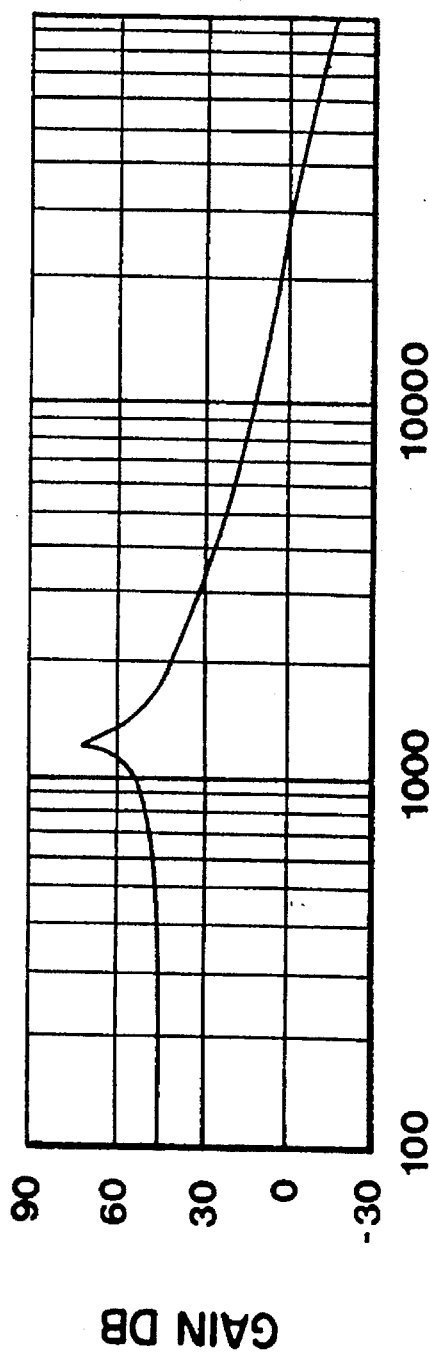
FIGS. 19A and 19B represent a Bode diagram for a TR servo loop of the second example of the present invention.
Figure 19B:
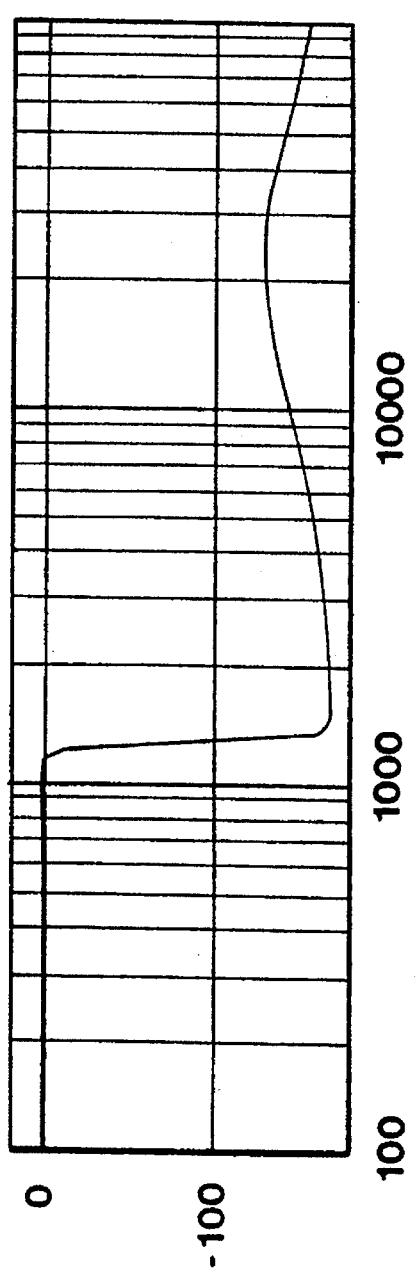
Figure 21:
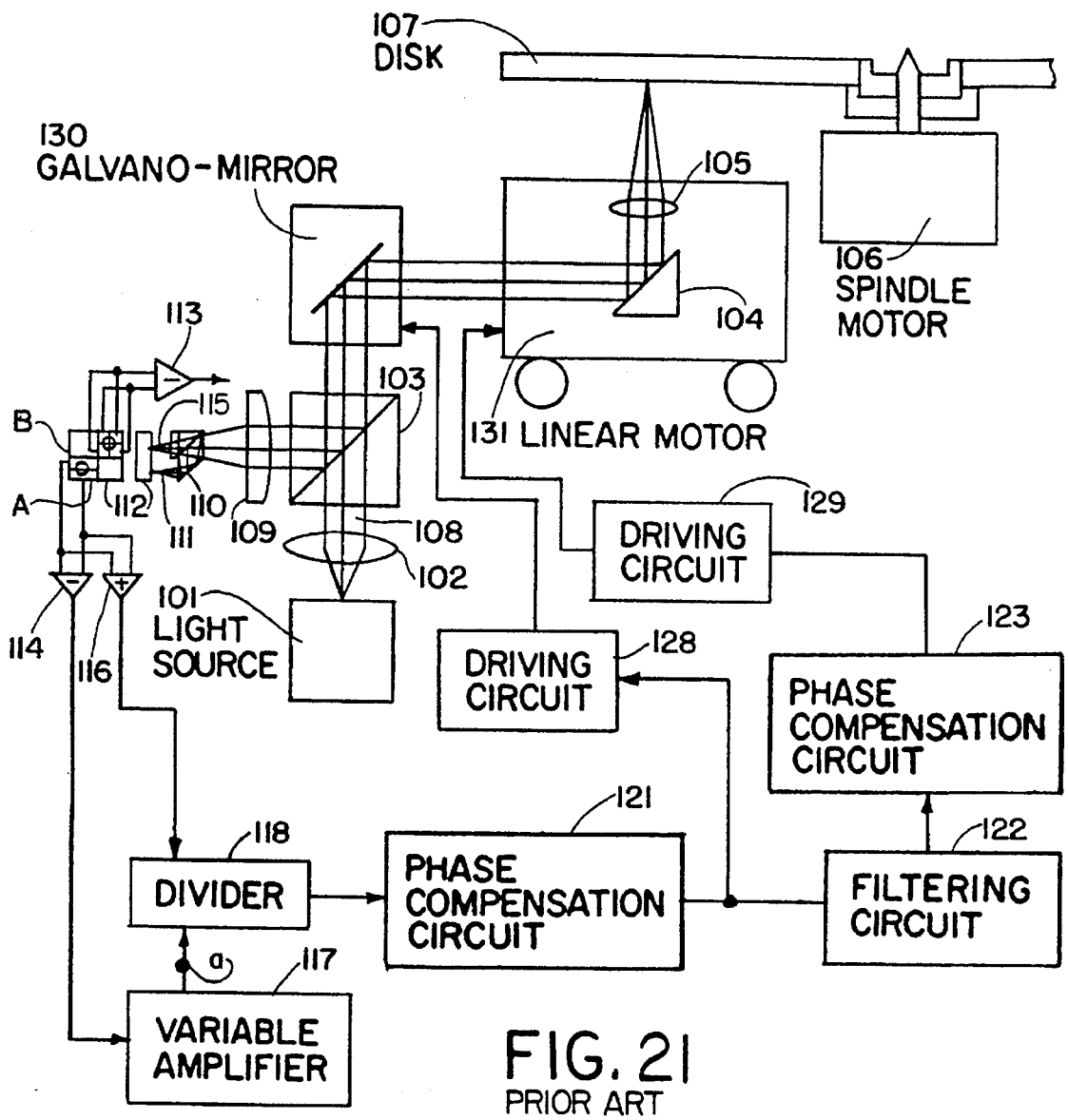
FIG. 21 is a block diagram showing a construction for a conventional tracking control system.
Figure 22:
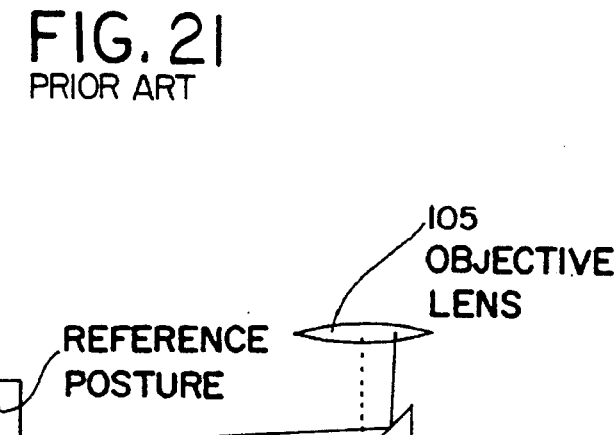
FIG. 22 is a view illustrating disagreement of optical axes due to a change in the posture of a galvano-mirror in a conventional tracking control system.

FIG. 16 is a block diagram showing a construction for the tracking control system according to the second example of the present invention. Components which also appear in tracking control system of the first example are given the same reference numerals as those in FIG. 1, and descriptions therefor are omitted. FIG. 17A is a view showing the waveform of a sine wave signal for driving a galvano-mirror 30. FIG. 17B shows the waveform of a TES, the offset of which is not corrected, when the galvano-mirror 30 is driven by the sine wave signal shown in FIG. 17A. FIG. 17C shows the waveform of a TES, the offset of which has been corrected, when the galvano-mirror 30 is driven by the sine wave signal shown in FIG. 17A. FIG. 18A shows a DC driving signal for driving the galvano-mirror 30. FIG. 18B shows the waveform of a TES, the offset of which is not corrected, when the galvano-mirror 30 is driven by the DC signal shown in FIG. 18A. FIG. 18C is a view showing the waveform of a TES, the offset of which has been corrected, when the galvano-mirror 30 is driven by the DC signal shown in FIG. 18A.

An offset-correction circuit is composed essentially of the following components: a phase compensation circuit 21 provided in a servo loop for controlling the operation of the galvano-mirror 30 (hereinafter, this servo loop is referred to as a "TR servo loop"); an equivalent filter circuit 22; a gain control circuit 51 which sets an offset correction gain for canceling the offset of a TES; and a differential amplifier 50. Whether tracking servo control is being conducted or not, a TES is subjected to an automatic gain control by a divider 18 and then input to a positive terminal of the differential amplifier 50. The amplitude of the TES output from the divider 18 is roughly constant against changes in the amount of light during a recording or erasing operation and changes in the reflectance of a disk 7. An output from the differential amplifier 50 is input=to the equivalent filter circuit 22 by way of the phase compensation circuit 21. An output from the equivalent filter circuit 22 is input to the gain control circuit 51, where gain control is conducted to attain an optimum gain for correction of the offset of the TES (hereinafter, this gain is referred to as an "offset-correction gain"). The output of the equivalent filter circuit 22 is, after going through the gain control circuit 51, input to a negative terminal of the differential amplifier 50. As a result, the differential amplifier 50 outputs a TES whose offset due to rotation of the galvano-mirror 30 has been canceled, as shown in FIGS. 17C and 18C.

A gain for the gain control circuit 51 is preset in the CPU 53 as a digital value when, for example, the system is fabricated. The offset-correction gain is set by converting the digital value into an analog signal at a D/A convertor 54 and then inputting the analog signal to the gain control circuit 51. However, the offset-correction gain may vary due to such factors as variation in the characteristics of the component parts of the system, difference in assembly of each system, and possible eccentricity of the disk 7. Therefore, it is necessary to further adjust the preset gain of the gain control circuit 51 in accordance with the optical system of the individual system and the disk 7 to be used.

Hereinafter, adjustment for the offset-correction gain will be described.

Adjustment for the offset-correction gain is conducted after focus control is completed so that a TES is obtained as an output from the divider 18, with tracking servo control being turned off. First, a DC signal shown in FIG. 18A, output by a driving signal generator 24, is fed to the galvano-mirror 30 by way of an adder 27 and a driving circuit 28 so as to drive the galvano-mirror 30. As a result, such a TES as shown in FIG. 18B is obtained as an output from the divider 18. The TES is then input to the differential amplifier 50.

In cases where the offset-correction gain set in the gain control circuit 51 is not appropriate, e.g. cases where the offset-correction gain set in the gain control circuit 51 is too small, the differential amplifier 50 outputs a TES substantially equal to the output of the divider 18. On the contrary, in cases where the offset-correction gain set in the gain control circuit 51 is too large, the differential amplifier 50 outputs a TES having an offset whose polarity is inverse with respect to that of the offset of the output from the divider 18.

An output signal from the differential amplifier 50 is digitalized by an A/D converter 52 and then input to the CPU 53, which detects a maximum value and a minimum value of the TES. An intermediate level of the amplitude of the TES is derived based on the maximum value and minimum value thus detected. A deviation amount $\delta V$ of the intermediate level from a reference voltage $V_{ref}$ is calculated. The digital value set in the CPU 53 is changed so as to make the deviation amount $\delta V$ substantially zero. Then, the D/A convertor 54 converts the changed digital value into an analog signal. The analog signal is input to the gain control circuit 51 as is mentioned above.

The gain control circuit 51 is composed essentially of a divider, for example. In that case, gain control for an of feet-correction value based on the digital value set in the CPU 53 is conducted by dividing an output from the equivalent filter circuit 22 with an analog signal from the D/A convertor 54 at the gain control circuit 51. The offset correction value thus obtained is input to the negative terminal of the differential amplifier 50, which subtracts the offset-correction value from the TES output by the divider 18 so as to produce a TES whose offset has been corrected.

The digital value keeps being updated until the deviation amount $\delta V$ becomes substantially zero. A digital value when the deviation amount $\delta V$ is substantially zero is set in the CPU 53 as an offset-correction digital value. Thus, the adjustment for the offset-correction gain has been completed.

Hereinafter, a frequency band for the tracking servo control system, allowable deviation from a given track, and tracking accuracy of the system will be described. FIGS. 19A, 19B and FIGS. 20A, 20B are Bode diagrams for, respectively, the servo loop for controlling the operation of the galvano-mirror 30 (TR servo loop) and a servo loop for controlling the operation of the linear motor 31 (hereinafter referred to as the "TRS servo loop"). The TR servo loop has a gain cross-over frequency of 4 kHz, while the TRS servo loop has that of 450 Hz. At 450 Hz and below, the tracking servo control is conducted mainly by driving the linear motor 31.

In the present example, a disk having a track pitch of 1.6 μm is used as the disk 7. Therefore, presuming that the tracking servo system has an allowable servo residue of ±0.08 μm, the TES should not deviate from the reference TES (i.e. the TES when no disagreement of optical axes is occurring) by more than an amount corresponding to a deviation of ±0.02 μm of the light spot from a sought track, in view of tracking accuracy. On the other hand, the light spot potentially travels for a maximum of ±10 μm on the disk 7 due to rotation of the galvano-mirror 30 during tracking servo control, since the galvano-mirror 30 has an $f_o$ of 200 Hz. That is, the TES may deviate from the reference TES by en amount corresponding to a deviation of ±0.178

μm of the light spot from the sought track on the disk 7, as is seen from FIG. 14. However, by conducting the above-mentioned correction the offset of the TES, it becomes possible to prevent the TES from deviating from the reference TES by more than an amount corresponding to a deviation of ±0.02 μm of the light spot from the sought track on the disk 7.

In the process of leading the tracking servo control system into a stable operation, the light spot travels for more than ±10 μm on the disk 7. However, by conducting the correction for the offset of the TES according to the present invention, it becomes possible to cancel the offset occurring due to rotation of the galvano-mirror 30, whereby the TES is prevented from deviating from the reference TES by more than an amount corresponding to a deviation of ±0.02 μm of the light spot from a sought track. As a result, it becomes possible to securely lead the tracking servo control system into a stable operation.

Moreover, it can be ensured that the TES is fairly symmetrical and that the TES always appears even if the posture of the galvano-mirror 30 when no tracking control is conducted shifts from the natural state. Therefore, in a searching operation, errors in counting the number of tracks, which is conducted using the TES, are minimized, that is, it becomes possible to count tracks accurately. Even if deterioration with age and/or change in thermal circumstances have changed the posture of the galvano-mirror 30 when no tracking servo control is conducted, it becomes possible to rotate the galvano-mirror 30 from the natural state, where the center axis of the light beam coincides with the optical axis of the optical system. Therefore, accurate and precise tracking servo control is realized by conducting correction for the offset of the TES according to the present invention.

In the present example, an output from the equivalent filter circuit 22 of the TRS servo loop is input to the gain control circuit 51. However, correction for the offset of the TES can also be conducted by incorporating, besides the equivalent filter circuit 22, an equivalent filter circuit having characteristics similar to the input-output characteristics, i.e. input-rotation characteristics, of the galvano-mirror 30. An output from the differential amplifier 50 is to be input to the newly incorporated equivalent filter circuit, and an output from the newly incorporated equivalent filter circuit is to be input to the gain control circuit 51. Moreover, a TES output by the divider 18 may alternatively be input to the newly incorporated equivalent instead of the output from the differential amplifier 50. In this case, the gain of the gain control circuit 51 should be set at a value which will substantially eliminate the offset of the TES.

Although the galvano-mirror 30 is used as the fine tracking actuator in the present example, a device using a prism or the like may alternatively be used instead of the galvano-mirror 30, as long as the device rotates so as to change the direction in which the light beam is directed.

Although the linear motor 31 is used as the coarse tracking actuator in the present example, a swing arm or the like may alternatively be used without undermining the effect of the invention.

Although the CPU 32 and the like is used for detection of symmetry of the offset characteristics or envelope characteristics of the TES in the present example, a hardware device having similar functions to the CPU 32 may alternatively be used. Moreover, although the means for correcting the offset of the TES, the gain control circuit 51, and the like are composed of hardware devices especially designed therefor, it is also possible to realize the same functions in a software-oriented configuration using a computer, etc.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A tracking control system comprising:

converging means for converging a light beam at a point on a recording medium to form a converging spot;

transportation means for receiving a driving signal and for moving the converging spot across tracks provided on the recording medium in response to the driving signal;

tracking error detecting means for generating a tracking error signal according to a position of the converging spot with respect to one of the tracks;

tracking servo control means for generating a first driving signal according to the tracking error signal and for feeding the first driving signal to the transportation means as the driving signal, by which the transportation means is driven so that the converging spot is located on the one track;

means for turning on and off the tracking servo control means;

driving means for, when tracking servo control is turned off, generating a second driving signal by which the transportation means is driven so that the converging spot crosses a predetermined number of tracks among the tracks, the predetermined number being more than one;

measuring means for, when the tracking servo control is turned off, measuring a degree of disagreement of optical axes based on the tracking error signal of a whole period in which the converging spot crosses the predetermined number of tracks, the tracking error signal being obtained by driving the transportation means with the second driving signal; and correcting means for correcting the disagreement of optical axes by constantly supplying the transportation means with a current for making the degree of disagreement of optical axes substantially zero based on the measured degree of disagreement of optical axes.

2. A tracking control system according to claim 1, wherein the transportation means comprises a fine tracking actuator for reflecting the light beam and for moving the converging point by changing a direction in which the light beam is reflected and a coarse tracking actuator for supporting the converging means and for moving the converging spot by moving the converging means, and the correcting means for disagreement of optical axes supplies the fine tracking actuator with a current.

3. A tracking control system according to claim 1, wherein the measuring means measures the degree of disagreement of optical axes on the basis of an offset of the tracking error signal.

4. A tracking control system according to claim 1, wherein the measuring means measures the degree of disagreement of optical axes on the basis of an envelope of the tracking error signal.

5. A tracking control system according to claim 2, wherein the driving means is connected to the fine tracking actuator and the fine tracking actuator is driven by the second driving signal.

6. A tracking control system according to claim 2, wherein the driving means is connected to the coarse tracking actuator and the coarse tracking actuator is driven by the second driving signal.

* * * * *